(12) United States Patent
Talarico et al.

(10) Patent No.: US 11,284,362 B2
(45) Date of Patent: Mar. 22, 2022

(54) SYNCHRONIZATION SIGNAL BLOCK FOR UNLICENSED CARRIER, AND LISTEN BEFORE TALK STRATEGIES FOR INITIAL ACCESS

(71) Applicant: Apple Inc., Cupertino, CA (US)

(72) Inventors: Salvatore Talarico, Sunnyvale, CA (US); Jeongho Jeon, San Jose, CA (US); Tom Cruz, Santa Clara, CA (US); Huaning Niu, Milpitas, CA (US); Wenting Chang, Beijing (CN)

(73) Assignee: Apple Inc., Cupertino, CA (US)

( * ) Notice: Subject to any disclaimer, the term of this patent is extended or adjusted under 35 U.S.C. 154(b) by 508 days.

(21) Appl. No.: 16/148,352

(22) Filed: Oct. 1, 2018

(65) Prior Publication Data

US 2019/0053177 A1    Feb. 14, 2019

Related U.S. Application Data

(60) Provisional application No. 62/566,715, filed on Oct. 2, 2017, provisional application No. 62/567,205, filed on Oct. 2, 2017.

(51) Int. Cl.
| | |
|---|---|
| *H04W 56/00* | (2009.01) |
| *H04W 72/04* | (2009.01) |
| *H04W 76/27* | (2018.01) |
| *H04L 23/02* | (2006.01) |
| *H04L 5/00* | (2006.01) |

(Continued)

(52) U.S. Cl.
CPC ........... *H04W 56/001* (2013.01); *H04L 5/001* (2013.01); *H04L 5/005* (2013.01); *H04L 23/02* (2013.01); *H04L 27/261* (2013.01); *H04W 72/042* (2013.01); *H04W 76/27* (2018.02); *H04L 5/0021* (2013.01); *H04L 5/0053* (2013.01); *H04W 74/0808* (2013.01)

(58) Field of Classification Search
CPC . H04W 56/001; H04W 76/27; H04W 72/042; H04W 74/0808; H04L 5/001; H04L 5/005; H04L 23/02; H04L 27/261; H04L 5/0021; H04L 5/0053; H04L 27/2655
See application file for complete search history.

(56) References Cited

U.S. PATENT DOCUMENTS

| | | | |
|---|---|---|---|
| 2018/0242232 A1* | 8/2018 | Chendamarai Kannan | ................. H04B 7/0695 |
| 2018/0242374 A1* | 8/2018 | Harada | ............. H04W 74/0808 |
| 2018/0316453 A1* | 11/2018 | Jeon | ....... H04W 16/14 |

(Continued)

*Primary Examiner* — Kibrom T Hailu
(74) *Attorney, Agent, or Firm* — Kowert, Hood, Munyon, Rankin & Goetzel, P.C.

(57) ABSTRACT

The disclosure describes design of a synchronization signal (SS) block for an unlicensed carrier, and listen before talk (LBT) strategies for initial access. An apparatus of a radio access network (RAN) is disclosed. The apparatus includes baseband circuitry that includes one or more processors and a radio frequency (RF) interface. The one or more processors are to generate, for user equipment (UE) operating on a licensed assisted access (LAA) secondary cell (SCell), a data sequence associated with an SS block. The SS block includes a primary synchronization signal (PSS) and a secondary synchronization signal (SSS), but does not include a physical broadcast channel (PBCH). The RF interface is to receive the data sequence from the one or more processors.

27 Claims, 14 Drawing Sheets

(51) Int. Cl.
  *H04L 27/26*  (2006.01)
  *H04W 74/08* (2009.01)

(56) References Cited

U.S. PATENT DOCUMENTS

| | | | |
|---|---|---|---|
| 2019/0132103 A1* | 5/2019 | Yang | H04L 5/0037 |
| 2019/0132882 A1* | 5/2019 | Li | H04L 27/26132 |
| 2019/0182819 A1* | 6/2019 | Li | H04W 74/08 |
| 2019/0281585 A1* | 9/2019 | Dinan | H04L 5/0091 |
| 2020/0029852 A1* | 1/2020 | Sakai | A61B 5/6804 |
| 2020/0221404 A1* | 7/2020 | Takeda | H04L 27/26025 |
| 2021/0144601 A1* | 5/2021 | Kazmi | H04W 36/0088 |

* cited by examiner

SYNCHRONIZATION SIGNAL BLOCK FOR UNLICENSED CARRIER, AND LISTEN BEFORE TALK STRATEGIES FOR INITIAL ACCESS

CROSS-REFERENCE TO RELATED APPLICATIONS

This application claims the benefit of priority under 35 USC 119(e) of U.S. Provisional Patent Application Ser. No. 62/566,715 entitled SYNCHRONIZATION SYMBOLS FOR NEW RADIO SYSTEM OPERATION IN UNLICENSED SPECTRUM, which was filed on Oct. 2, 2017, and U.S. Provisional Patent Application Ser. No. 62/567,205 entitled LISTEN BEFORE TALK STRATEGIES FOR THE INITIAL ACCESS OF NR UNLICENSED, which was filed on Oct. 2, 2017, each of which is incorporated herein by reference in its entirety.

TECHNICAL FIELD

This disclosure is generally related to design of a synchronization signal (SS) block for an unlicensed carrier, and listen before talk (LBT) strategies for initial access, and more specifically to the design of an SS block for a licensed assisted access (LAA) secondary cell (SCell), and LBT strategies for initial access in an unlicensed carrier.

BACKGROUND ART

Each year, the number of mobile devices connected to wireless networks significantly increases. In order to keep up with the demand in mobile data traffic, some changes have to be made to system requirements to be able to meet these demands. Three critical areas expected to be enhanced in order to deliver this increase in traffic are larger bandwidth, lower latency, and higher data rates.

One of the major limiting factors in wireless innovation is the availability in spectrum. To mitigate this, the unlicensed spectrum has been an area of interest to expand the availability of Long-Term Evolution (LTE). In this context, one of the major enhancements for LTE in 3GPP (Third Generation Partnership Project) Release 13 has been to enable its operation in the unlicensed spectrum via Licensed-Assisted Access (LAA), which expands the system bandwidth by utilizing the flexible carrier aggregation (CA) framework introduced by the LTE-Advanced system.

BRIEF DESCRIPTION OF THE DRAWINGS

Other features and advantages of the disclosure will become apparent in the following detailed description of the embodiments with reference to the accompanying drawings, of which.

DESCRIPTION OF THE EMBODIMENTS

Figure 1:
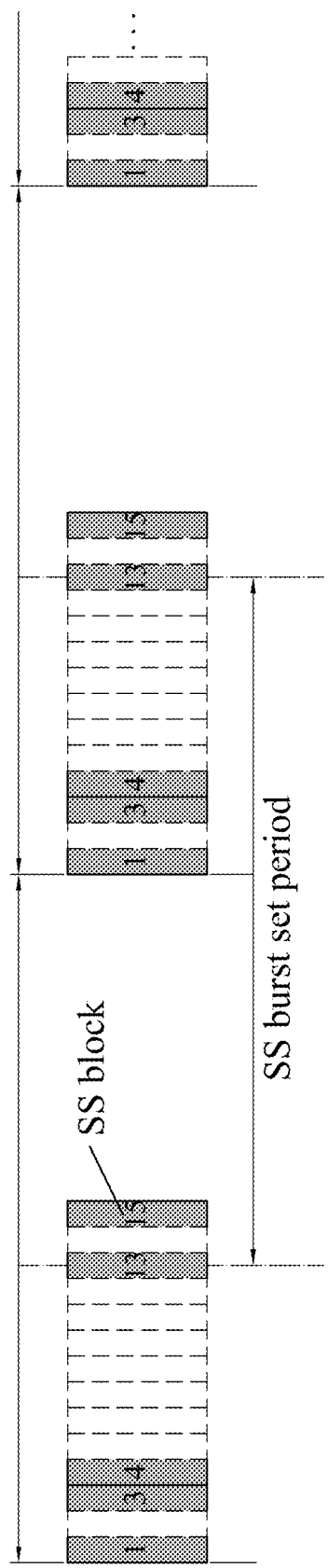
FIG. 1 illustrates an example of a typical synchronization signal (SS) burst in New Radio (NR)

Before the present technology is disclosed and described, it is to be understood that this technology is not limited to the particular structures, process actions, or materials disclosed herein, but is extended to equivalents thereof as would be recognized by those ordinarily skilled in the relevant arts. It should also be understood that terminology used herein is for the purpose of describing particular examples only and is not intended to be limiting.

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc., in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail. For the purposes of the present document, the expression "A or B" means A, B, or A and B.

Various embodiments may comprise one or more elements. An element may comprise any structure arranged to perform certain operations. Each element may be implemented as hardware, software, or any combination thereof, as desired for a given set of design parameters or performance constraints. Although an embodiment may be described with a limited number of elements in a certain topology by way of example, the embodiment may include more or less elements in alternate topologies as desired for a given implementation. It is worthy to note that any reference to "one embodiment" or "an embodiment" means that a particular feature, structure, or characteristic described in connection with the embodiment is included in at least one embodiment. The appearances of the phrases "in one embodiment," "in some embodiments," and "in various embodiments" in various places in the specification are not necessarily all referring to the same embodiment.

Fifth Generation (5G) New Radio (NR) wireless communication systems are expected to have enhanced operations in unlicensed spectrum. An exemplary operating environment of the NR wireless communication system includes a user equipment (UE) (e.g., a smart phone) and a radio access network (RAN) node (e.g., a cellular base station) communicating with each other. In some embodiments, the RAN node may include baseband circuitry and radio frequency (RF) circuitry. The baseband circuitry may include an RF interface to send/receive data to/from the RF circuitry, and one or more processors to handle various radio control functions that enable communication with one or more radio networks via the RF circuitry. The radio control functions may include, but are not limited to, signal modulation/demodulation, encoding/decoding, radio frequency shifting, etc. The RF circuitry is configured to enable communication through the wireless connection using modulated electromagnetic radiation. In various embodiments, the RF circuitry may include switches, filters, amplifiers, etc., to facilitate the communication through the wireless connection. In some embodiments, the UE may also have baseband circuitry similar to the baseband circuitry of the RAN node to handle radio control functions, and RF circuitry similar to the RF circuitry of the RAN node to enable communication through the wireless connection.

As used herein, the term "circuitry" may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

Design of a Synchronization Signal Block for an Unlicensed Carrier

In NR, the basic block for synchronization is defined as a synchronization signal (SS) block. Multiple SS blocks compose an SS burst, where each SS block is related to a specific beam in a radiation pattern. Referring to FIG. 1, an SS burst is repeated every SS burst set period, and contains the same SS blocks sent in the first burst in the same order and occurring over the time domain.

Figure 2:
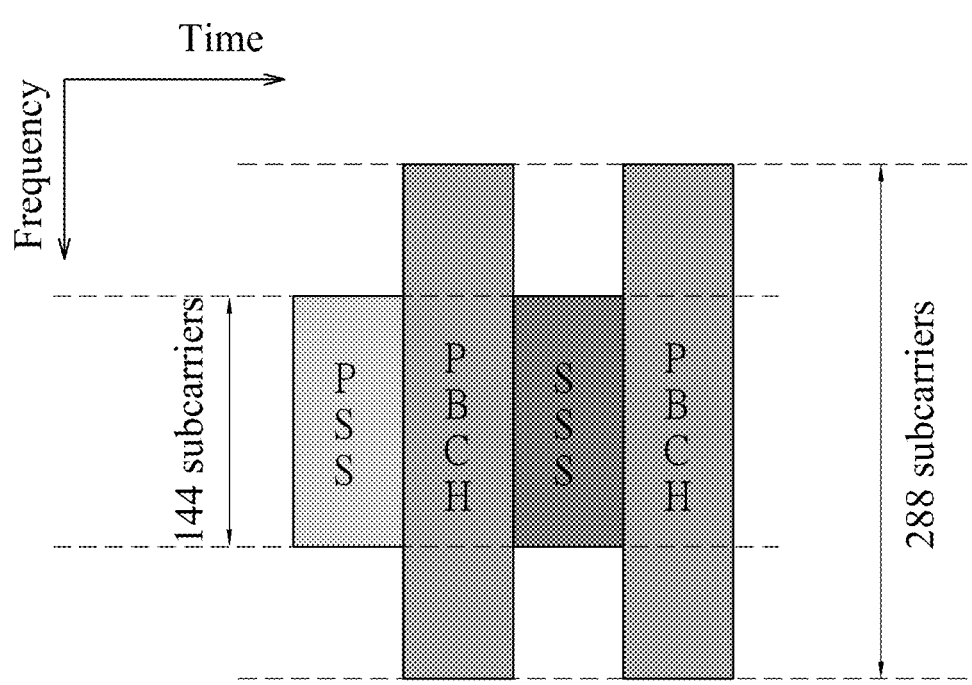
FIG. 2 illustrates an example of an NR SS block.

The NR SS Block is composed by one symbol for a primary synchronization signal (PSS), one symbol for a secondary synchronization signal (SSS), and two symbols for a physical broadcast channel (PBCH). The symbol herein is exemplified as, but not limited to, an Orthogonal Frequency-Division Multiplexing (OFDM) symbol. Referring to FIG. 2, within the NR SS block, the symbol ordering for the aforementioned signals is designed in the following order: PSS-PBCH-SSS-PBCH. While the symbol for each of the PSS and SSS spreads over twelve physical resource blocks (PRBs), where each PRB consists of twelve subcarriers and the first eight and last nine subcarriers included in the twelve PRBs (i.e., 144 subcarrier) are used as a guard tones, each symbol for PBCH extends over twenty-four PRBs.

Figure 3:
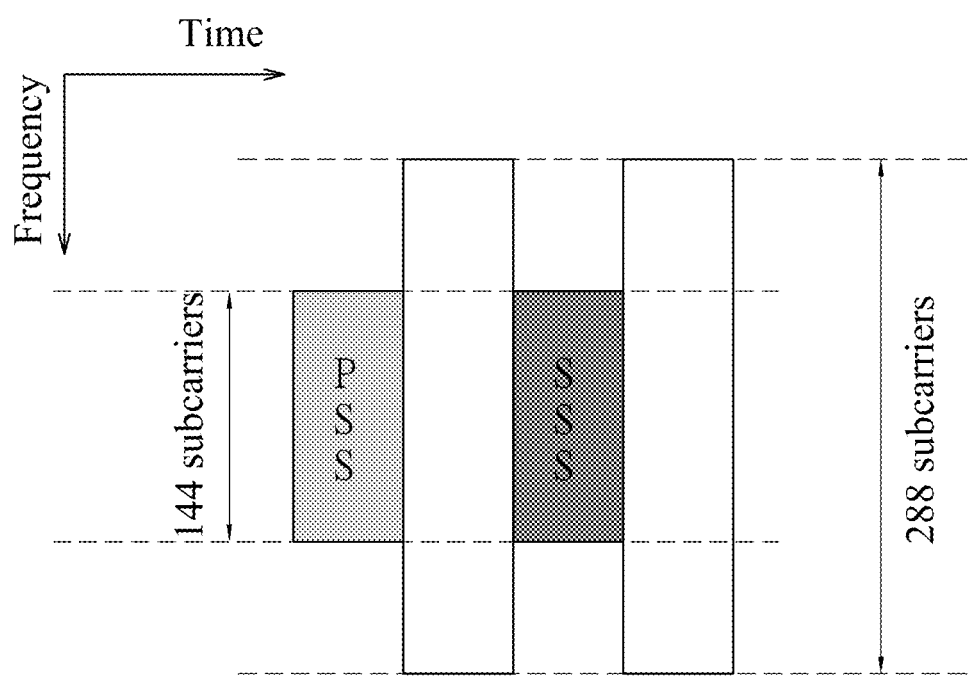
FIG. 3 illustrates an example of an SS block where a physical broadcast channel (PBCH) is not transmitted.

In Licensed-Assisted Access (LAA), UE operates on two component carriers. One of the two component carriers is a licensed carrier that uses a licensed spectrum on which a primary cell (PCell) operates, and the other one of the two component carriers is an unlicensed carrier that uses an unlicensed spectrum on which a secondary cell (SCell) operates. Some of the physical channels are only to be sent by the licensed carrier from the PCell. Accordingly, when UE is operating on the LAA SCell, there is a case in which the PBCH may be absent, because signals regarding the PBCH are handled and transmitted through the PCell. In the scenario that the PBCH may not be transmitted, two OFDM symbols are left empty and a gap is left between the PSS and SSS as shown in FIG. 3. In order to make use of these resources, different options are proposed to account for these empty symbols.

In a first option, symbols are allocated for physical downlink control channel (PDCCH) and/or physical downlink shared channel (PDSCH). Some embodiments for the first option are provided hereinafter.

In some embodiments, the OFDM symbols previously dedicated to PBCH transmission within an SS block are not used for synchronization purposes, and these OFDM symbols are allocated for other transmissions, such as PDCCH/PDSCH transmission. The configuration regarding utilization of the unused symbols is designed to be intrinsic to LAA operation. Alternatively, receiving, detecting, demodulating, and/or decoding the PDCCH/PDSCH on the OFDM symbols previously dedicated to PBCH transmission may be configurable through radio resource control (RRC) or downlink control information (DCI).

Specifically, an apparatus of a RAN includes baseband circuitry that includes one or more processors and an RF interface. The one or more processors are to generate, for UE operating on an LAA SCell, a data sequence associated with an SS block. The SS block includes a PSS and an SSS, but does not include a PBCH. The RF interface is to receive the data sequence from the one or more processors. The one or more processors of the baseband circuitry of the RAN are further to generate one of PDCCH content and PDSCH content to be provided to the UE over a transmission resource (e.g., the OFDM symbols) originally allocated for PBCH. The one or more processors of the baseband circuitry of the RAN are further to generate one of RRC data and DCI data for configuration of the UE in terms of receiving said one of the PDCCH content and the PDSCH content.

With respect to UE side, in some embodiments, the UE in connected mode always detects the transmission of PSS and SSS, and rate-match the PDSCH or PDCCH around the PSS and SSS. In other embodiments, the UE in connected mode does not detect the PSS and SSS, and instead decodes the PDSCH or PDCCH by assuming there is PDSCH or PDCCH transmission on those symbols originally allocated for PBCH.

In a second option, PSS is deferred, and some embodiments for the second option are provided hereinafter.

Figure 4:
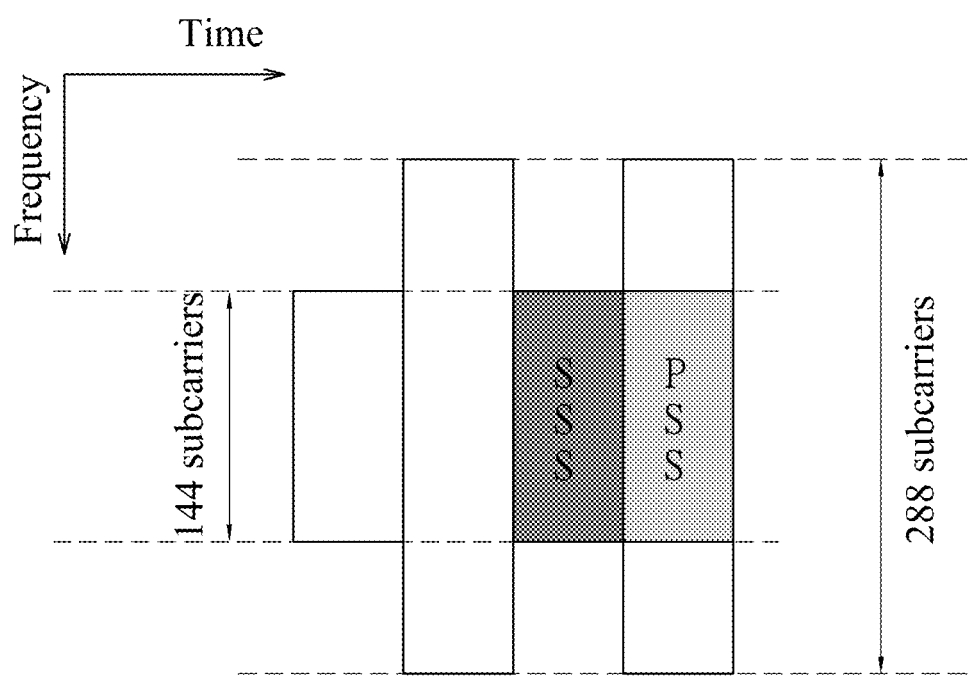
FIG. 4 illustrates an example of an SS block where the primary synchronization signal (PSS) is deferred to the last symbol originally allocated for the PBCH.

In some embodiments, referring to FIG. 4, the PSS is transmitted within a last OFDM symbol originally allocated for PBCH (i.e., transmission of the PSS is deferred), and the OFDM symbol originally allocated for the PSS is left empty. This configuration is signaled through higher layer signaling or DCI.

Specifically, the one or more processors of the baseband circuitry of the RAN are to generate the data sequence associated with the SS block which includes the PSS to be included in the last OFDM symbol originally allocated for PBCH in the SS Block. In some embodiments, a center frequency of the PSS is identical to a center frequency of the SSS in the SS block, and the SSS is to be included in a second last OFDM symbol of the SS block. In some embodiments, the remaining resources are used for other types of transmission, e.g., PDCCH transmission. In some embodiments, in order to fully use the whole bandwidth available, and to improve timing and coarse frequency offset estimation, the PSS is repeated in frequency domain over the last OFDM symbol originally allocated for PBCH transmission. That is, a first instance of the PSS is located in first twelve PRBs, a second instance of the PSS is located in another twelve PRBs immediately following the first twelve PRBs, and an orthogonal cover code (OCC), e.g., [1, −1], is applied to the first and second instances of the PSS in frequency domain. In some embodiments, in order to use the full bandwidth, a sequence of the PSS is rate-matched over (i.e., to span over) the whole twenty-four PRBs available. In some embodiments, a new, longer sequence for the PSS can be designed which spreads over the whole twenty-four PRBs, and a part of it (e.g., the tail and head of the twenty-four PRBs) may be left for guard tones. The sequence of the PSS is a binary phase-shift keying (BPSK) modulated maximum length sequence (MLS, also known as m-sequence), a Zad-off-Chu (ZC) sequence or a different sequence (e.g., a pseudo-random or computer-generated sequence). In some embodiments, a sequence of the deferred PSS is characterized by a different set of cyclic-shifts other than a sequence of the 5G NR PSS.

This proposed solution is able to prevent, regardless of the subcarrier spacing and mapping pattern, potential puncturing of the PDCCH, maintaining full backward compatibility with LTE-legacy. In other words, the PSS and the SSS are transmitted in a contiguous manner. Regardless of whether the PDCCH is transmitted in the time/frequency domain resources which are not used for PBCH, no gap is introduced among the symbols used for synchronization (i.e., the PSS and SSS).

In a third option, the PSS and SSS are extended through time and/or frequency repetition. Some embodiments for the third option are provided hereinafter.

Figure 5:
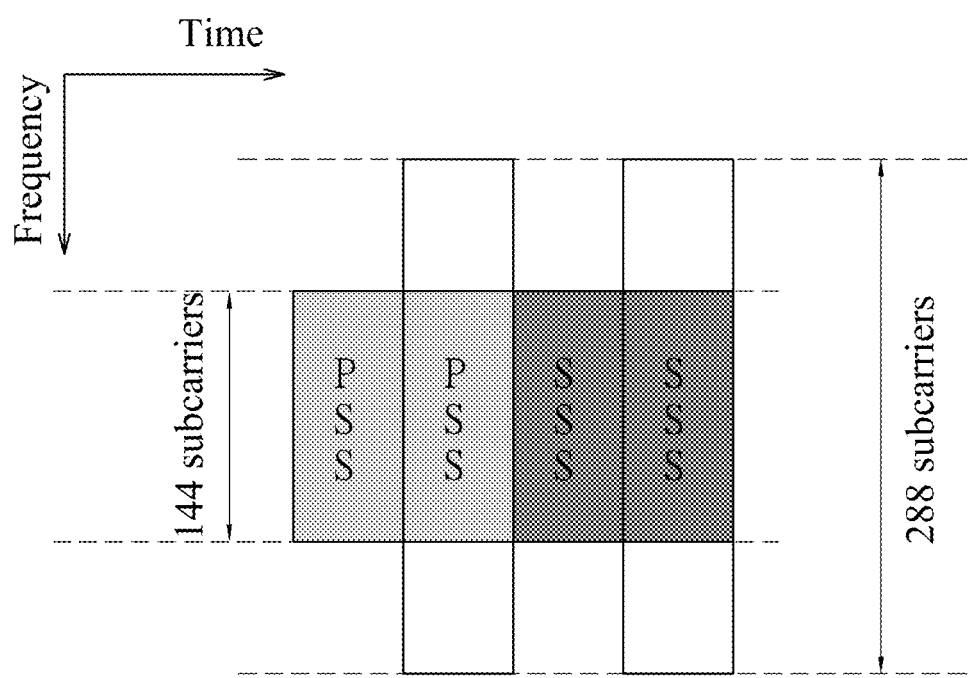
FIG. 5 illustrates an example of an SS block where the PSS and the secondary synchronization signal (SSS) are repeated in time domain.

Referring to FIG. 5, in some embodiments, the unused symbols originally allocated for PBCH within an SS block are used to transmit additional repetitions of sequences of 5G NR PSS and SSS. In some embodiments, two consecutive OFDM symbols are used for PSS or SSS transmission, where the second OFDM symbol contains a repetition of the sequence transmitted in the first OFDM symbol. Specifically, the one or more processors of the baseband circuitry of the RAN are to generate the data sequence associated with the SS block which includes a repetition of the PSS and a repetition of the SSS to be included in OFDM symbols originally allocated for PBCH in the SS block. Moreover, the one or more processors of the baseband circuitry of the RAN are to generate the data sequence associated with the SS block which includes the repetition of the PSS to be included in a first OFDM symbol originally allocated for PBCH in the SS block, and the repetition of the SSS to be included in a second OFDM symbol originally allocated for PBCH in the SS block as shown in FIG. 5. In other embodiments, the first OFDM symbol originally allocated for PBCH transmission contains a repetition of the SSS transmission, and the second OFMD symbol originally allocated for PBCH transmission contains a repetition of the PSS transmission. In some embodiments, an OCC may be applied between two or more time and/or frequency repetitions of PSS and/or SSS. In some embodiments, the unused resources are devoted for different usage, e.g., PDCCH transmission.

Figure 6:
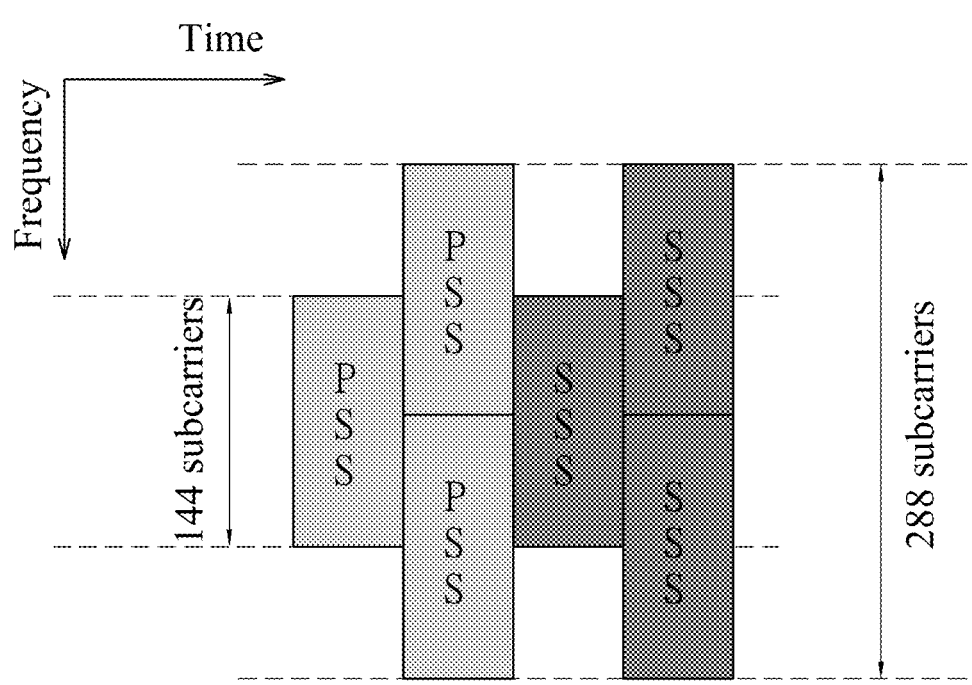
FIG. 6 illustrates an example of an SS block where the PSS and the SSS are repeated in both time and frequency domains.

Referring to FIG. 6, in some embodiments, the ODFM symbols originally allocated for PBCH transmission are used for transmission of the PSS and the SSS, which are each repeated twice in frequency domain using the whole twenty-four PRBs available in the corresponding ODFM symbol originally allocated for PBCH transmission. Specifically, the one or more processors of the baseband circuitry of the RAN are to generate the data sequence associated with the SS block which includes the repetition of the PSS and the repetition of the SSS, one of which is duplicated in frequency domain over one of the OFDM symbols originally allocated for PBCH in the SS block. In some embodiments, an OCC may be applied between two PSS (or SSS) repetitions in frequency domain.

In some embodiments, the PSS and/or the SSS can be repeated over the symbols originally allocated for PBCH, and they can be rate-matched to spread across the full bandwidth available. In other words, the PSS and/or the SSS can be repeated in both time and/or frequency domain resources. The idea is to utilize all the resources, which are left empty due to not transmitting PBCH, to transmit additional PSS and SSS. In some embodiments, new, longer PSS and SSS sequences are designed, and transmitted over the OFDM symbols originally allocated for PBCH with each spreading over the twenty-four PRBs available in the corresponding OFDM symbol originally allocated for PBCH transmission, leaving a few tones empty at the tail and head of these twenty-four PRBs as guard tones. Specifically, the one or more processors of the baseband circuitry of the RAN are to generate the data sequence associated with the SS block which includes the repetition of the PSS and the repetition of the SSS, one of which is designed to cover a larger frequency span and to be included in the full bandwidth available on one of the OFDM symbols originally allocated for PBCH in the SS block.

In some embodiments, the sequences of the additional PSS and SSS are different from the sequences of the 5G NR PSS/SSS. These sequences of the additional PSS and SSS can be formed as BPSK modulated MLS with different cyclic shifts than the sequences of the 5G NR PSS/SSS, or they can be ZC sequences that follow the LTE design, or can be pseudo-random or computer-generated sequences. In some embodiments, if the resources originally allocated for PBCH are used for frequency/time repetitions of the NR PSS/SSS, coherent combining across symbols within an SS block can be applied in order to improved detection performances. In some embodiments, the PSS is repeated more times than the SSS either in time and/or frequency, or vice versa. For example, one OFDM symbol originally allocated for PBCH is fully used for PSS transmission through one or two repetitions in frequency domain, while the other OFDM symbol originally allocated for PBCH is partially used for PSS transmission and partially used for SSS transmission (e.g., first twelve PRBs for PSS and second twelve PRBs for SSS or vice versa).

Aside from utilizing the resources originally allocated for the PBCH in an SS block, other resources not used for the transmission of an SS block can be utilized for the purpose of synchronization. In some embodiments, regardless of the use of an SS block in order to improve the performance of the initial access for UEs at the cell edge, OFDM symbols other than those used to contain SS blocks can be used to carry PSS/SSS sequences to form an extended SS block. Specifically, the one or more processors of the baseband circuitry of the RAN are to generate another data sequence associated with one of a PSS and an SSS to be included in an OFDM symbol which is originally not used to carry an SS block.

Figure 7:
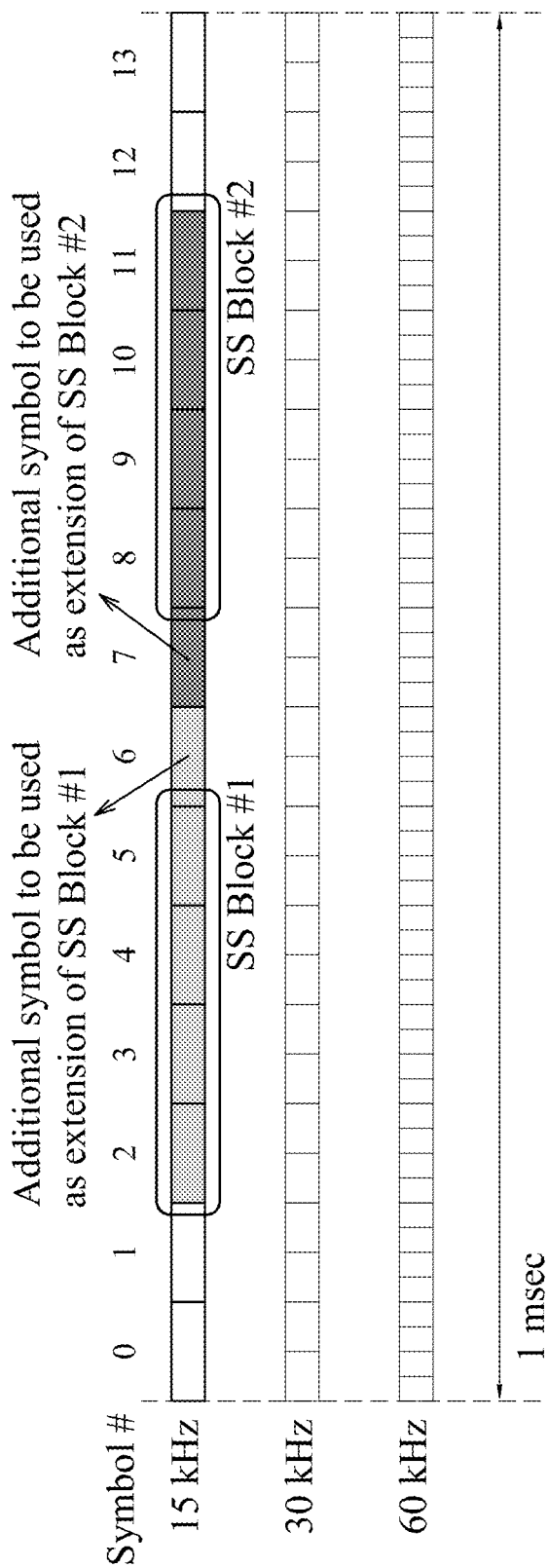
FIG. 7 illustrates an example of extended SS blocks realized by utilizing additional Orthogonal Frequency-Division Multiplexing (OFDM) symbols originally not used to carry SS blocks.

Referring to FIG. 7, in some embodiments, based on the subcarrier spacing, the first and/or last X ODFM symbols of specific slots are not used to carry synchronization signals in order to avoid PDCCH/PUCCH puncturing (e.g., X=2 for all slots in a 15 KHz subcarrier spacing scenario, or first X=4 for even slots and last X=4 of odd slots in a 30 KHz subcarrier spacing scenario with the LTE compliant frame pattern), and all or some of the remaining symbols are devoted to synchronization purposes. Specifically, the one or more processors of the baseband circuitry of the RAN are to generate the another data sequence associated with one of the PSS and the SSS to be included in the OFDM symbol of a specific slot, where the OFDM symbol does not belong to first X OFDM symbols or last X OFDM symbols of the specific slot, where X is an integer decided according subcarrier spacing. For example, for 15 KHz subcarrier spacing, in each slot devoted to SS transmission, symbols 2-6 are allocated to one SS block (i.e., SS Block #1) and symbols 7-11 are allocated for another SS block (i.e., SS Block #2). While NR allocates four symbols for SS block, the additional symbol can be used for additional time/frequency repetitions of PSS and/or SSS, where the center carrier is aligned with the original NR SS block. In some embodiments, only twelve PRBs are used in the additional symbol, which carries one NR PSS or NR SSS. In some embodiments, twenty-four PRBs are used, and either two PSS or SSS sequences are carried or one PSS and one SSS sequence are carried.

Figure 8:
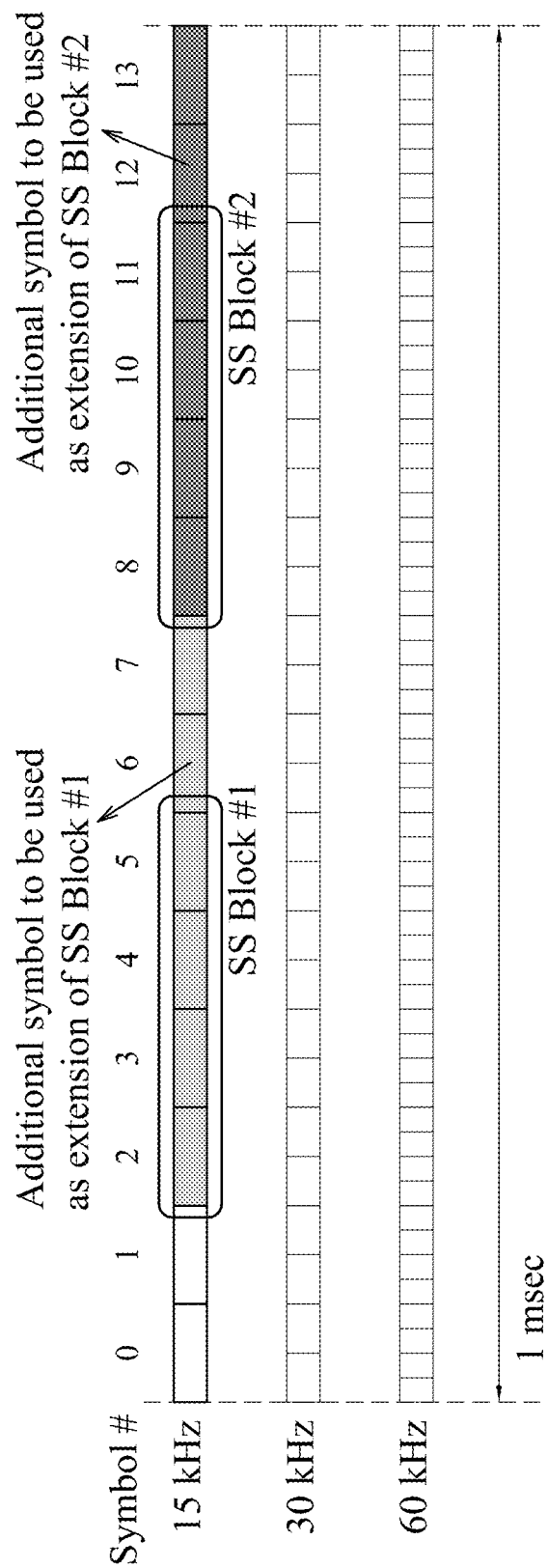
FIG. 8 illustrates another example of extended SS blocks realized by utilizing additional OFDM symbols originally not used to carry SS blocks.

Referring to FIG. 8, in some embodiments, based on the subcarrier spacing, the last X OFDM symbols of specific slots, which are normally left empty for PUCCH, are also used to enhance the initial access, together with the symbols that are usually neither used for PDCCH/PUCCH nor to carry SS blocks. Specifically, the one or more processors of the baseband circuitry of the RAN are to generate the another data sequence associated with one of the PSS and the SSS to be included in the OFDM symbol of a specific slot, where the OFDM symbol belongs to last X OFDM symbols of the specific slot or OFDM symbols originally not used for transmission of PDCCH and PUCCH, where X is an integer decided according to subcarrier spacing. For example, for 15 KHz subcarrier spacing, in each slot devoted to SS transmission, symbols 2-7 are allocated to one SS block and symbols 8-13 are allocated for another SS block. While NR allocates four symbols for SS block, the additional two symbols can be used for additional time/frequency repetitions of PSS and/or SSS, where the center carrier is aligned with the original NR SS block. In some embodiments, only twelve PRBs are used in each of the two additional symbols, which carries one NR PSS or one NR SSS. In some embodiments, twenty-four PRBs in each of the two additional symbols are used, and either two PSS or SSS sequences are carried or one PSS and one SSS sequence are carried.

Listen Before Talk Strategies for Initial Access in an Unlicensed Carrier

When the 5G NR wireless communication system operates in an unlicensed spectrum, listen before talk (LBT) can be used to acquire the channel, while maintaining coexistence with other technologies that operate in the same bandwidth, and avoiding collisions with other unscheduled transmissions.

For NR operations in an unlicensed spectrum, channel access methods are to be applied in order to allow a device to acquire the channel, and to perform a transmission without colliding with other scheduled transmissions and other technologies operating on the same bandwidth. In this regard, this disclosure focuses on how to perform clear channel assessment (CCA) during the initial access, and specifically focuses on how LBT can be implemented to transmit synchronization signal (SS) blocks. The SS blocks carry primary synchronization signals (PSSs), secondary synchronization signals (SSSs), and broadcasting information (i.e., PBCH) that are used to acquire OFDM symbol timing estimate, coarse frequency offset estimate, cell identification, system frame number (SFN) information, and configuration information related to the NR physical downlink control channel (NR-PDCCH). The NR-PDCCH schedules the NR physical downlink shared channel (NR-PDSCH) carrying the remaining minimum system information (RMSI).

In some embodiments, such as the carrier aggregation (CA) scenario, the unlicensed carrier is only used for secondary cells (SCells). In other embodiments, such as the standalone 5G scenario where there is no licensed anchor and the whole system operates in unlicensed spectrum, the unlicensed carrier can also be used for primary cells (PCells). In some embodiments, while performing initial access, LBT is used to acquire the channel, and the transmission of a single SS block, or an SS burst is performed subsequently. Specifically, an apparatus of a radio access network (RAN) includes baseband circuitry that includes one or more processors and a radio frequency (RF) interface. The one or more processors are to generate, for initial access in an unlicensed carrier, data containing information regarding LBT, which is to be performed to acquire a channel for transmission of at least one SS block. The RF interface is to receive the data from the one or more processors.

The LBT may be performed in the case the SS blocks are consecutive to each other (which might be the case when all potential SS block positions are equal to the actual SS block positions and SS blocks totaling the maximum number allowed per subcarrier spacing and frequency carrier are used). Alternatively, the LBT may be performed in the case that the SS blocks are not consecutive to each other.

In this disclosure, different options on how to apply LBT are proposed in the context of initial access and SS block transmission.

In a first option, the LBT is to be applied before the transmission of each SS burst. Some embodiments for the first option are provided hereinafter.

In some embodiments, a category 4 (Cat-4) LBT is applied before the transmission of each SS burst, which includes a plurality of SS blocks. The LBT covers the SS burst duration. In other words, a channel occupancy time related to success of the LBT is not smaller than duration of the SS burst. If the LBT does not succeed before the beginning of the SS burst, three of the following proposals are introduced.

With respect to the first proposal, the SS blocks before the success of the LBT are skipped, and the remaining SS blocks are transmitted. Specifically, when it is determined by the one or more processors of the baseband circuitry of the RAN that the LBT did not succeed before a time point the SS burst is expected to start being transmitted, the LBT is performed repeatedly until success of the LBT is obtained, a portion of the SS blocks of the SS burst, which is expected to be transmitted from the time point up to a moment of the success of the LBT, is skipped from being transmitted, and a remaining portion of the SS blocks of the SS burst is transmitted.

With respect to the second proposal, the entire SS burst is skipped. Specifically, when it is determined by the one or more processors of the baseband circuitry of the RAN that the LBT did not succeed before the SS burst is expected to start being transmitted, all of the SS blocks of the SS burst are skipped from being transmitted.

With respect to the third proposal, the start of transmission of the SS burst is deferred in time domain, and the transmission starts right after the LBT succeeds. Specifically, when it is determined by the one or more processors of the baseband circuitry of the RAN that the LBT did not succeed before a time point the SS burst is expected to start being transmitted, the LBT is performed repeatedly until success of the LBT is obtained, and start of transmission of the SS burst is deferred to a moment the success of the LBT is obtained. In this case, a timing index in each SS block is either kept the same, or is changed according to the shift (deferment) applied.

In some embodiments, a maximum shifting value is applied, and the SS burst is skipped after the maximum shifting value is reached. That is to say, if the transmission of the SS burst is deferred such that a part of the SS burst will be performed in a next half frame of a radio frame, then either the whole transmission is skipped, or the SS burst is transmitted up to a boundary between a current half frame of the radio frame and the next half frame of the radio frame and the SS blocks that will fall within the next half frame are skipped. In some embodiments, the LBT procedure is always initiated in a first half frame of a radio frame, and a part of the SS burst is skipped according to when the success of the LBT is obtained. Specifically, after the deferment, only a portion of the SS blocks of the SS burst up to a boundary between a first half frame of a radio frame and a second half frame of the radio frame is transmitted, and a remaining portion of the SS blocks of the SS burst is skipped from being transmitted, where the first and second half frames constitute the radio frame.

In some embodiments, the SS burst cannot be deferred more than half a frame (i.e., a half frame), so that it does not overlap with the next possible SS burst. In other words, the SS burst cannot be deferred in time such that some of the SS blocks would fall within the next half frame. In some embodiments, the LBT procedure is always initiated in the first half frame of the radio frame, and the SS burst is at most shifted up to a maximum, such that the SS burst does not overlap with a next SS burst. That is to say, the SS burst is shifted but the shifted SS burst cannot exceed a boundary between the first half frame and the second half frame. Specifically, the one or more processors of the baseband circuitry of the RAN are to configure the data containing information regarding LBT to enable the LBT to be initiated in a first half frame of a radio frame, and the start of the transmission of the SS burst is deferred in such a manner that none of the SS blocks of the SS burst is to be transmitted within a second half frame of the radio frame.

In some embodiments, if a part or the whole of the SS burst cannot be performed during the first half frame of the radio frame, the LBT procedure is re-performed in the second half frame of the radio frame, in order to perform the transmission of the remaining SS burst, which was not completed in the first half frame. Specifically, the one or more processors of the baseband circuitry of the RAN are to configure the data containing information regarding LBT to enable the LBT to be initiated in a first half frame of a radio frame, and when it is determined that not all of the SS blocks of the SS burst can be transmitted in the first half frame, the LBT is performed once again in a second half frame of the radio frame in order to perform the transmission of a portion of the SS blocks of the SS burst not completed in the first radio frame.

In some embodiments, a procedure of the LBT is performed at the beginning of each of two half frames of a radio frame, and transmission of the SS burst is performed in only one of the two half frames.

In the second option regarding how to apply LBT, the LBT is performed before each SS block. Specifically, the one or more processors of the baseband circuitry of the RAN are to determine a category of the LBT based on subcarrier spacing, and the LBT is to be performed before the transmission of each SS block. In some embodiments, the start of transmission of an SS block is deferred in time domain, up to a given point, ensuring that the SS block transmission cannot overlap other SS block transmissions, or otherwise the SS block is skipped from being transmitted. In one embodiment, a single shot LBT is performed at the beginning of each SS block transmission.

In the third option regarding how to apply LBT, the LBT is performed before each slot containing two or more SS blocks. Specifically, the one or more processors of the baseband circuitry of the RAN are to determine a category of the LBT based on subcarrier spacing, and the LBT is to be performed before each slot where two or more SS blocks are to be transmitted. In some embodiments, if the LBT is applied at each slot containing SS blocks and is repeated until success of the LBT is obtained, the block(s) before the success of the LBT is (are) skipped, and the remaining SS blocks are transmitted upon the success of the LBT. In some embodiments, if the LBT does not succeed before a time point the first SS block is expected to be transmitted, all of the SS blocks within that slot are skipped. In some embodiments, the start of the SS block is deferred but remains within a same slot.

In some embodiments, the LBT is to be performed for each group of consecutive SS blocks, and a priority class of the LBT is decided according to a length of the consecutive SS blocks (e.g., defined by a number of the consecutive SS blocks) in the group. In some embodiments, according to the priority class of the LBT, the SS blocks are shifted up to a maximum point, such that the SS blocks will not collide with subsequent SS block transmission. In some embodiments, the SS block(s) will not be deferred, with the LBT being expected to succeed before a certain range (e.g., before the SS block(s) is (are) expected to start), or otherwise, the SS block(s) is (are) skipped.

5G NR Architecture

Figure 9:
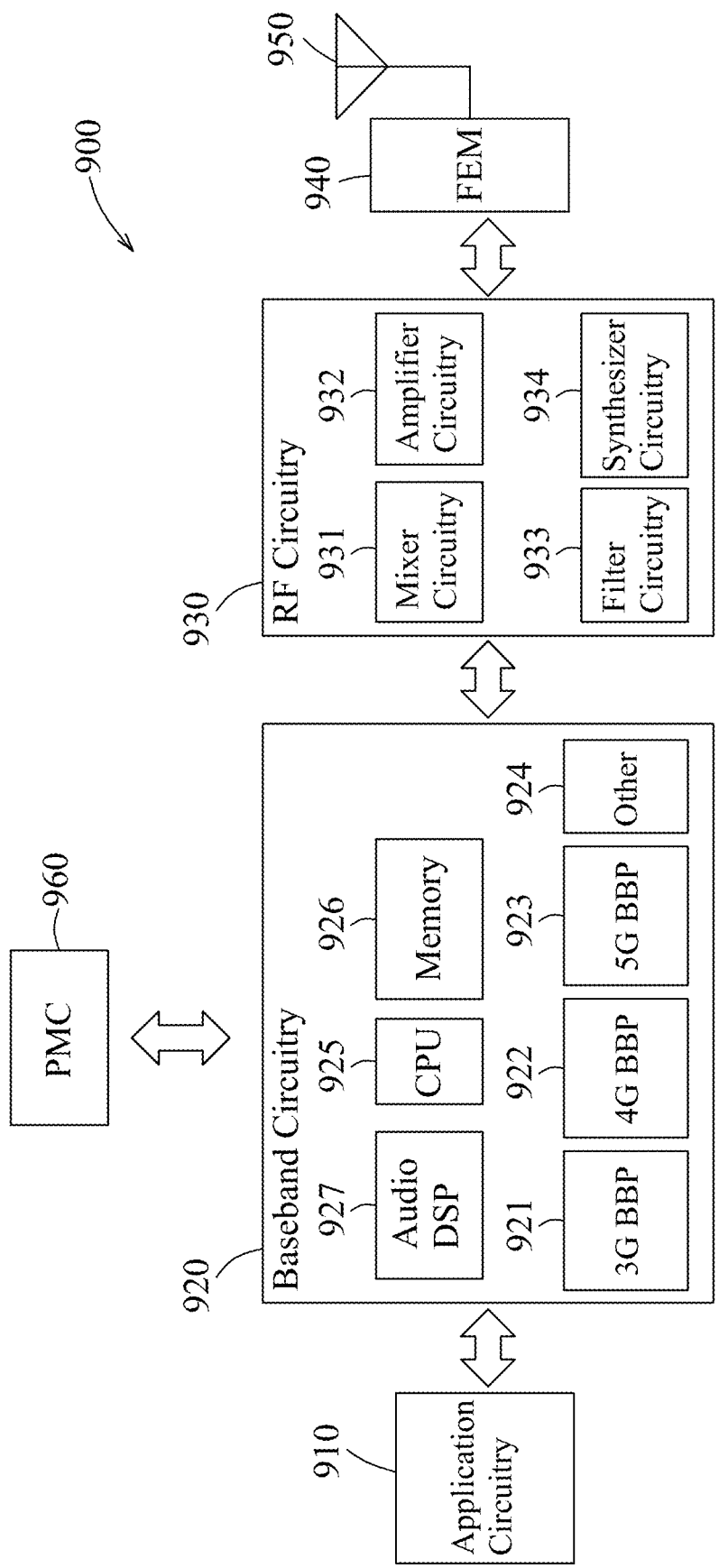
FIG. 9 is a schematic block diagram illustrating an apparatus according to some embodiments of this disclosure.

FIG. 9 illustrates an example of an apparatus 900 in accordance with some embodiments of this disclosure. For example, the apparatus 900 may be included in a user equipment (UE) or a radio access network (RAN) node. In this embodiment, the apparatus 900 includes application circuitry 910, baseband circuitry 920, radio frequency (RF) circuitry 930, front-end module (FEM) circuitry 940, one or more antennas 950 (only one is depicted) and power management circuitry (PMC) 960. In some embodiments, the apparatus 900 may include fewer components. For example, a RAN node may not include the application circuitry 910, and instead may include a processor/controller to process Internet-Protocol (IP) data received from an evolved packet core (EPC) network. In other embodiments, the apparatus 900 may include additional components, for example, a memory/storage device, a display, a camera, a sensor or an input/output (I/O) interface. In some embodiments, the above-mentioned components may be included in more than one device. For example, in order to implement a Cloud-RAN architecture, the above-mentioned circuitries may be separated and included in two or more devices in the Cloud-RAN architecture.

The application circuitry 910 may include one or more application processors. For example, the application circuitry 910 may include, but is not limited to, one or more single-core or multi-core processors. The processors may include any combination of general-purpose processors and dedicated processors (e.g., graphics processors, application processors, etc.). The processors may be coupled to or include a memory/storage module, and may be configured to execute instructions stored in the memory/storage module to enable various applications or operating systems to run on the apparatus 900. In some embodiments, the processors of the application circuitry 910 may process IP data packets received from an EPC network.

In some embodiments, the baseband circuitry 920 may provide for communication compatible with one or more radio technologies. For example, in some embodiments, the baseband circuitry 920 may support communication with an evolved universal terrestrial radio access network (EU-TRAN) or other wireless metropolitan area networks (WMAN), a wireless local area network (WLAN), or a wireless personal area network (WPAN). In some embodiments where the baseband circuitry 920 is configured to support radio communication using more than one wireless protocol, the baseband circuitry 920 may be referred to as a multi-mode baseband circuitry.

The baseband circuitry 920 may include, but is not limited to, one or more single-core or multi-core processors. The baseband circuitry 920 may include one or more baseband processors or control logic to process baseband signals received from the RF circuitry 930, and to generate baseband signals to be transmitted to the RF circuitry 930. The baseband circuitry 920 may interface and communicate with the application circuitry 910 for generation and processing of the baseband signals and for controlling operations of the RF circuitry 930.

In some embodiments, the baseband circuitry 920 may include a third generation (3G) baseband processor (3G BBP) 921, a fourth generation (4G) baseband processor (4G BBP) 922, a fifth generation (5G) baseband processor (5G BBP) 923 and other baseband processor(s) 924 for other existing generations, generations in development or to be developed in the future (e.g., second generation (2G), sixth generation (6G), etc.). The baseband processors 921-924 of the baseband circuitry 920 are configured to handle various radio control functions that enable communication with one or more radio networks via the RF circuitry 930. In other embodiments, the baseband circuitry 920 may further include a central processing unit (CPU) 925 and a memory 926, and some or all functionality (e.g., the radio control functions) of the baseband processors 921-924 may be implemented as software modules that are stored in the memory 926 and executed by the CPU 925 to carry out the functionality. The radio control functions of the baseband processors 921-924 may include, but are not limited to, signal modulation/demodulation, encoding/decoding, radio frequency shifting, etc. In some embodiments, the signal modulation/demodulation includes Fast-Fourier Transform (FFT), pre-coding or constellation mapping/de-mapping. In some embodiments, the encoding/decoding includes convolution, tail-biting convolution, turbo, Viterbi, or Low Density Parity Check (LDPC) encoding/decoding. Embodiments of the signal modulation/demodulation and the encoding/decoding are not limited to these examples and may include other suitable operations in other embodiments. In some embodiments, the baseband circuitry 920 may further include an audio digital signal processor (DSP) 927 for compression/decompression and echo cancellation.

In some embodiments, the components of the baseband circuitry 920 may be integrated as a single chip or a single chipset, or may be disposed on a single circuit board. In some embodiments, some or all of the constituent components of the baseband circuitry 920 and the application circuitry 910 may be integrated as, for example, a system on chip (SoC).

The RF circuitry 930 is configured to enable communication with wireless networks using modulated electromagnetic radiation through a non-solid medium. In various embodiments, the RF circuitry 930 may include switches, filters, amplifiers, etc., to facilitate communication with the wireless network. The RF circuitry 930 may include a receive signal path that includes circuitry to down-convert RF signals received from the FEM circuitry 940 and to provide the baseband signals to the baseband circuitry 920. The RF circuitry 930 may further include a transmit signal path that includes circuitry to up-convert the baseband signals provided by the baseband circuitry 920 and to provide RF output signals to the FEM circuitry 940 for transmission.

In some embodiments, the receive signal path of the RF circuitry 930 may include mixer circuitry 931, amplifier circuitry 932 and filter circuitry 933. In some embodiments, the transmit signal path of the RF circuitry 930 may include filter circuitry 933 and mixer circuitry 931. The RF circuitry 930 may also include synthesizer circuitry 934 for synthesizing a frequency for use by the mixer circuitry 931 of the receive signal path and/or the transmit signal path.

For the receive signal path, in some embodiments, the mixer circuitry 931 may be configured to down-convert RF signals received from the FEM circuitry 940 based on the synthesized frequency provided by synthesizer circuitry 934. The amplifier circuitry 932 may be configured to amplify the down-converted signals. The filter circuitry 933 may be a low-pass filter (LPF) or a band-pass filter (BPF) configured to remove unwanted signals from the down-converted signals to generate output baseband signals. The output baseband signals may be provided to the baseband circuitry 920 for further processing. In some embodiments, the output baseband signals may be zero-frequency baseband signals, although this is not a requirement. In some embodiments, the mixer circuitry 931 of the receive signal path may include passive mixers, although the scope of the embodiments is not limited in this respect.

As for the transmit signal path, in some embodiments, the mixer circuitry 931 may be configured to up-convert input baseband signals based on the synthesized frequency provided by the synthesizer circuitry 934 to generate the RF output signals for the FEM circuitry 940. The input baseband signals may be provided by the baseband circuitry 920, and may be filtered by the filter circuitry 933.

In some embodiments, the mixer circuitry 931 of the receive signal path and the mixer circuitry 931 of the transmit signal path may include two or more mixers and may be arranged for quadrature down-conversion in the receive signal path and for quadrature up-conversion in the transmit signal path. In some embodiments, the mixer circuitry 931 of the receive signal path and the mixer circuitry 931 of the transmit signal path may include two or more mixers and may be arranged for image rejection (e.g., Hartley image rejection). In some embodiments, the mixer circuitry 931 of the receive signal path and the mixer circuitry 931 of the transmit signal path may be arranged for direct down-conversion and direct up-conversion, respectively. In some embodiments, the mixer circuitry 931 of the receive signal path and the mixer circuitry 931 of the transmit signal path may be configured for super-heterodyne operation.

In some embodiments, the output baseband signals and the input baseband signals may be analog baseband signals, although the scope of the embodiments is not limited in this respect. In alternative embodiments, the output baseband signals and the input baseband signals may be digital baseband signals. In such alternative embodiments, the RF circuitry 930 may further include analog-to-digital converter (ADC) circuitry and digital-to-analog converter (DAC) circuitry, and the baseband circuitry 920 may include a digital baseband interface to communicate with the RF circuitry 930.

In some dual-mode embodiments, a separate radio IC circuitry may be provided for processing signals for each spectrum, although the scope of the embodiments is not limited in this respect.

In some embodiments, the synthesizer circuitry 934 may be a fractional-N synthesizer or a fractional N/N+1 synthesizer, although the scope of the embodiments is not limited in this respect as other types of frequency synthesizers may be suitable. For example, the synthesizer circuitry 934 may be a delta-sigma synthesizer, a frequency multiplier, or a synthesizer comprising a phase-locked loop with a frequency divider in other embodiments.

The synthesizer circuitry 934 may be configured to synthesize an output frequency for use by the mixer circuitry 931 of the RF circuitry 930 based on a frequency input and a divider control input. In some embodiments, the frequency input may be provided by a voltage controlled oscillator (VCO), although that is not a requirement. In some embodiments, the divider control input may be provided by either the baseband circuitry 920 or the application circuitry 910 depending on the desired output frequency. In some embodiments, the divider control input (e.g., N) may be determined according to a look-up table based on a channel indicated by the application circuitry 910.

The synthesizer circuitry 934 of the RF circuitry 930 may include a divider, a delay-locked loop (DLL), a multiplexer and a phase accumulator. In some embodiments, the divider may be a dual modulus divider (DMD), and the phase accumulator may be a digital phase accumulator (DPA). In some embodiments, the DMD may be configured to divide an input signal by either N or N+1 (e.g., based on a carry out) to provide a fractional division ratio. In some embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is a number of the delay elements in the delay line. In this way, the DLL provides negative feedback to help ensure that the total delay through the delay line is one VCO cycle.

In some embodiments, the synthesizer circuitry 934 may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 930 may include an IQ/polar converter.

The FEM circuitry 940 may include a receive signal path that includes circuitry configured to operate on RF signals received from the one or more antennas 950, to amplify the received RF signals and to provide amplified versions of the received RF signals to the RF circuitry 930 for further processing. The FEM circuitry 940 may further include a transmit signal path that includes circuitry configured to amplify signals provided by the RF circuitry 930 for transmission by one or more of the one or more antennas 950. In various embodiments, the amplification through the transmit or receive signal path may be done solely in the RF circuitry 930, solely in the FEM circuitry 940, or in both the RF circuitry 930 and the FEM circuitry 940.

In some embodiments, the FEM circuitry 940 may include a TX/RX switch to switch between transmit mode operation and receive mode operation. The receive signal path of the FEM circuitry 940 may include a low-noise amplifier (LNA) to amplify the received RF signals and to provide the amplified versions of the received RF signals as an output (e.g., to the RF circuitry 930). The transmit signal path of the FEM circuitry 940 may include a power amplifier (PA) to amplify input RF signals (e.g., provided by the RF circuitry 930), and one or more filters to generate RF signals for subsequent transmission (e.g., by one or more of the one or more antennas 950).

In some embodiments, the PMC 960 is configured to manage power provided to the baseband circuitry 920. In particular, the PMC 960 may control power-source selection, voltage scaling, battery charging, or DC-to-DC conversion. The PMC 960 may often be included in the apparatus 900 when the apparatus 900 is capable of being powered by a battery. For example, when the apparatus 900 is included in a UE, it generally includes the PMC 960. The PMC 960 may increase the power conversion efficiency while providing desirable implementation size and heat dissipation characteristics.

While FIG. 9 shows the PMC 960 being coupled only with the baseband circuitry 920, in other embodiments, the PMC 960 may be additionally or alternatively coupled with, and perform similar power management operations for, other components such as, but not limited to, the application circuitry 910, the RF circuitry 930 or the FEM 940.

In some embodiments, the PMC 960 may control, or otherwise be part of, various power saving mechanisms of the apparatus 900. For example, if the apparatus 900 is in an RRC_Connected state, where it is still connected to the RAN node as it expects to receive traffic shortly, then it may enter a state known as Discontinuous Reception Mode (DRX) after a period of inactivity. During this state, the apparatus 900 may power down for brief intervals of time and thus save power.

If there is no data traffic activity for an extended period of time, then the apparatus 900 may enter an RRC_Idle state, where it disconnects from network and does not perform operations such as channel quality feedback, handover, etc. The apparatus 900 goes into a very low power state and it performs paging where it periodically wakes up to listen to the network and then powers down again. The apparatus 900 may not receive data in this state. In order to receive data, the apparatus 900 transitions back to the RRC_Connected state.

An additional power saving mode may allow a device or apparatus to be unavailable to the network for periods longer than a paging interval (ranging from seconds to a few hours). During this time, the device or apparatus is totally unreachable to the network and may power down completely. Any data sent during this time incurs a large delay and it is assumed the delay is acceptable.

Processors of the application circuitry 910 and processors of the baseband circuitry 920 may be used to execute elements of one or more instances of a protocol stack. For example, processors of the baseband circuitry 920, alone or in combination, may be used to execute Layer 3, Layer 2, or Layer 1 functionality, while processors of the application circuitry 910 may utilize data (e.g., packet data) received from these layers and further execute Layer 4 functionality (e.g., transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/RAN node, described in further detail below.

Figure 10:
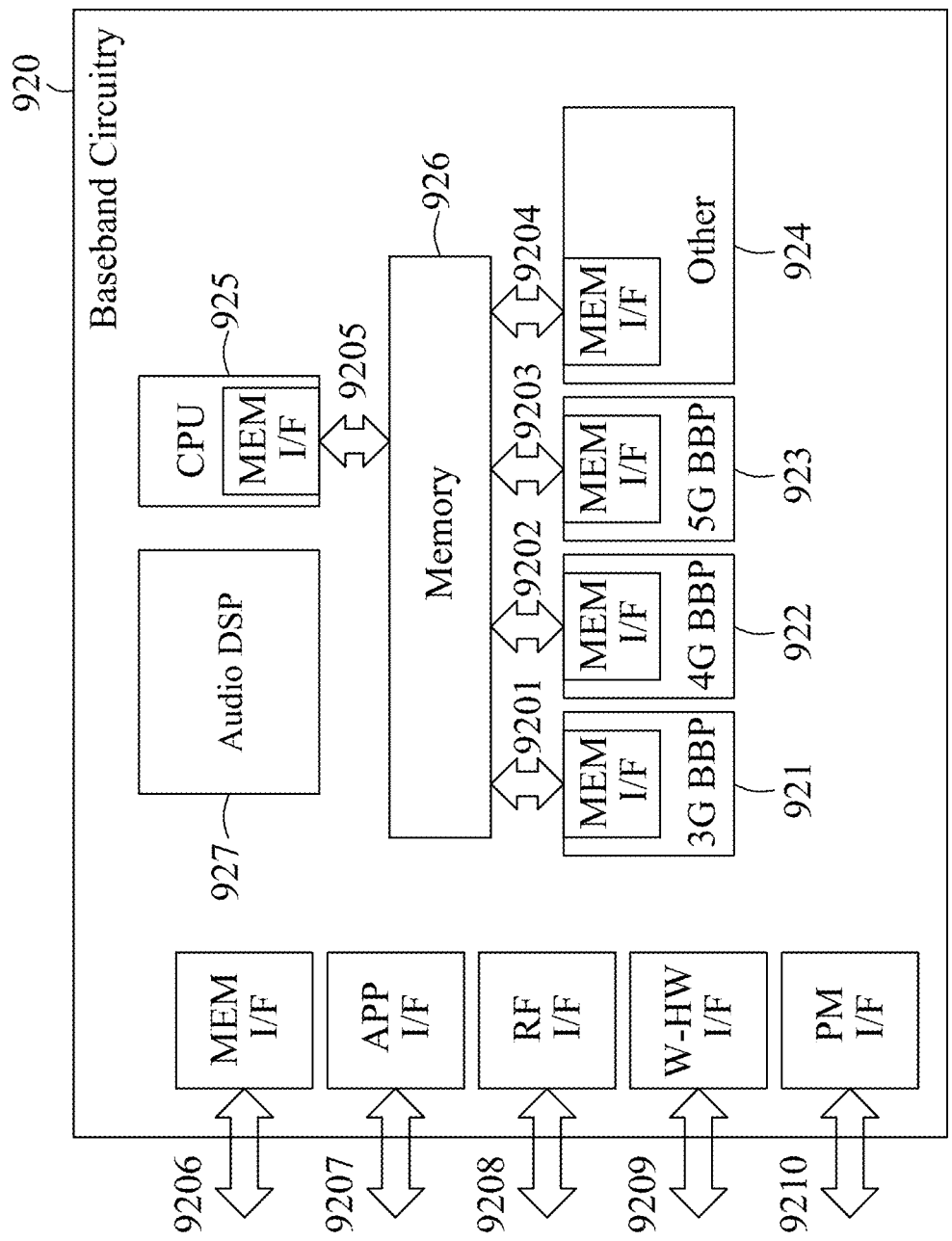
FIG. 10 illustrates example interfaces of baseband circuitry according to some embodiments of this disclosure.

FIG. 10 illustrates example interfaces of baseband circuitry in accordance with some embodiments. As discussed above, the baseband circuitry 920 of FIG. 9 includes various processors (i.e., the baseband processors 921-924 and the CPU 925), and the memory 926 utilized by the processors. Each of the processors 921-925 may include an internal memory interface (MEM I/F) 9201-9205 communicatively coupled to the memory 926 so as to send/receive data to/from the memory 926.

The baseband circuitry 920 may further include one or more interfaces to communicatively couple to other circuitries/devices. The one or more interfaces include, for example, a memory interface (MEM I/F) 9206 (e.g., an interface to send/receive data to/from memory external to the baseband circuitry 920), an application circuitry interface (APP I/F) 9207 (e.g., an interface to send/receive data to/from the application circuitry 910 of FIG. 9), an RF circuitry interface (RF I/F) 9208 (e.g., an interface to send/receive data to/from the RF circuitry 930 of FIG. 9), a wireless hardware connectivity interface (W-HW I/F) 9209 (e.g., an interface to send/receive data to/from Near Field Communication (NFC) components, Bluetooth® components (e.g., Bluetooth® Low Energy), Wi-Fi® components, and/or other communication components), and a power management interface (PM I/F) 9210 (e.g., an interface to send/receive power or control signals to/from the PMC 960 of FIG. 9).

Figure 11:
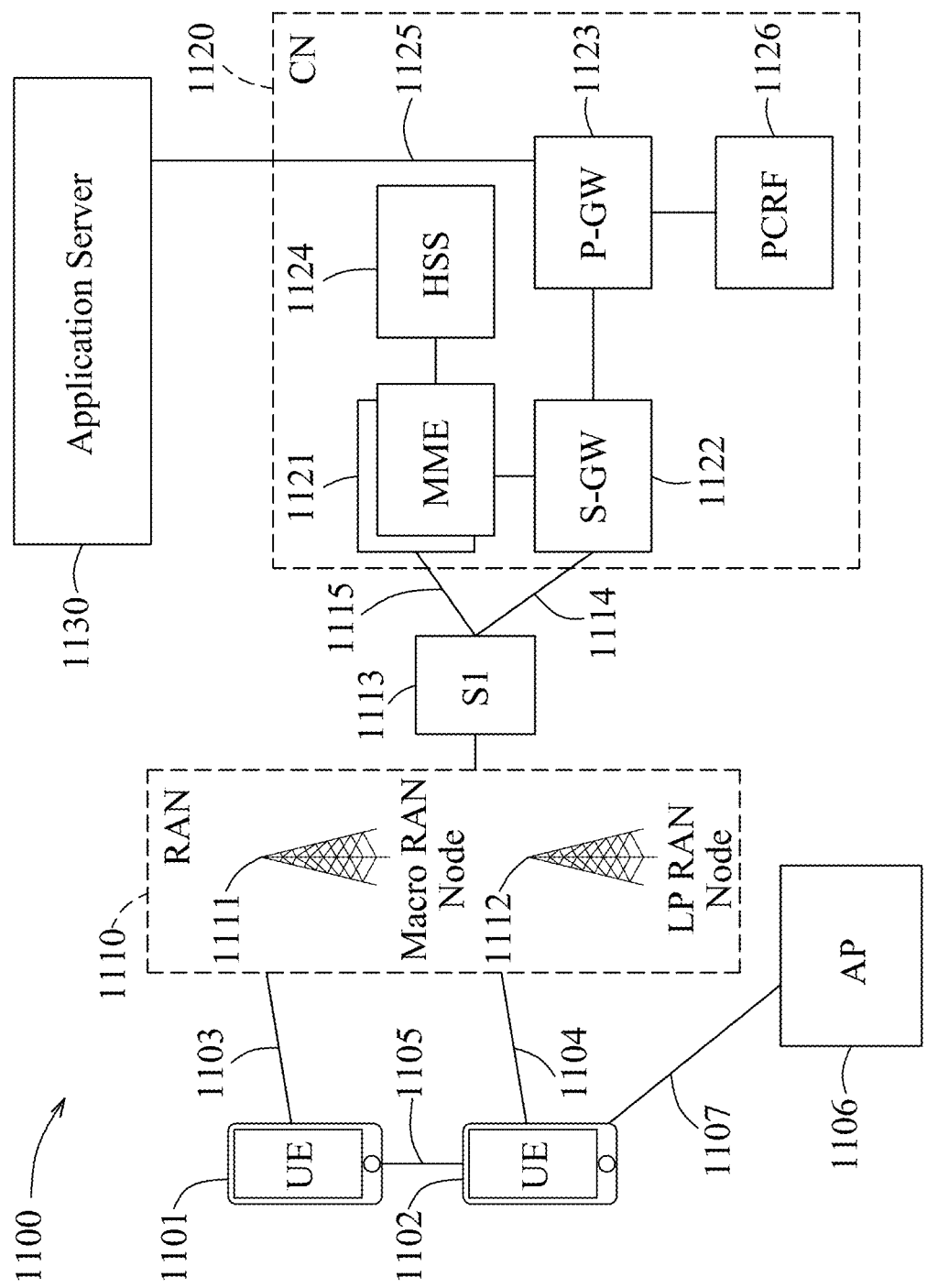
FIG. 11 illustrates an architecture of a system of a network according to some embodiments of this disclosure.

FIG. 11 illustrates an architecture of a system 1100 of a network in accordance with some embodiments of this disclosure. The system 1100 is shown to include a user equipment (UE) 1101 and a UE 1102. The UEs 1101 and 1102 are illustrated as smartphones (e.g., handheld touch-screen mobile computing devices connectable to one or more cellular networks), but may also include any mobile or non-mobile computing device, such as Personal Data Assistants (PDAs), pagers, laptop computers, desktop computers, wireless handsets, or any computing device including a wireless communications interface.

In some embodiments, at least one of the UEs 1101 and 1102 may be an Internet-of-Things (IoT) UE, which can include a network access layer designed for low-power IoT applications utilizing short-lived UE connections. An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UE may execute background applications (e.g., keep-alive messages, status updates, etc.) to facilitate the connections of the IoT network.

The UEs 1101 and 1102 may be configured to connect, e.g., communicatively couple, with a radio access network (RAN) 1110. The RAN 1110 may be, for example, an Evolved Universal Mobile Telecommunications System (UMTS) Terrestrial Radio Access Network (E-UTRAN), a NextGen RAN (NG RAN), or some other type of RAN. The UEs 1101 and 1102 utilize connections 1103 and 1104, respectively. Each of the connections 1103 and 1104 includes a physical communications interface or layer (discussed in further detail below). In this embodiment, the connections 1103 and 1104 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and the like.

In this embodiment, the UEs 1101 and 1102 may further directly exchange communication data via a ProSe interface 1105. The ProSe interface 1105 may alternatively be referred to as a sidelink interface including one or more logical channels. The one or more logical channels include, but are not limited to, a Physical Sidelink Control Channel (PSCCH), a Physical Sidelink Shared Channel (PSSCH), a Physical Sidelink Discovery Channel (PSDCH) and a Physical Sidelink Broadcast Channel (PSBCH).

The UE 1102 is shown to be configured to access an access point (AP) 1106 via connection 1107. The connection 1107 may include a local wireless connection, such as a connection consistent with any IEEE 802.11 protocol, wherein the AP 1106 may include a wireless fidelity (WiFi®) router. In this example, the AP 1106 is shown to be connected to the Internet without connecting to a core network 1120 of the wireless system 1100 (described in further detail below).

The RAN 1110 can include one or more access nodes that enable the connections 1103 and 1104. These access nodes (ANs) can be referred to as base stations (BSs), NodeBs, evolved NodeBs (eNBs), next Generation NodeBs (gNB), RAN nodes, and so forth, and can include ground stations (e.g., terrestrial access points) or satellite stations providing coverage within a geographic area (e.g., a cell). In some embodiments, the RAN 1110 may include one or more RAN nodes for providing macrocells, e.g., macro RAN node 1111, and one or more RAN nodes for providing femtocells or picocells (e.g., cells having smaller coverage areas, smaller user capacity, or higher bandwidth compared to macrocells), e.g., low power (LP) RAN node 1112.

Any one of the RAN nodes 1111 and 1112 can terminate the air interface protocol and can be the first point of contact for the UEs 1101 and 1102. In some embodiments, any one of the RAN nodes 1111 and 1112 can fulfill various logical functions for the RAN 1110 including, but not limited to, radio network controller (RNC) functions such as radio bearer management, uplink and downlink dynamic radio resource management and data packet scheduling, and mobility management.

According to some embodiments, the UEs 1101 and 1102 can be configured to communicate using Orthogonal Frequency-Division Multiplexing (OFDM) communication signals with each other or with any of the RAN nodes 1111 and 1112 over a multicarrier communication channel in accordance with various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe or sidelink communications). It is noted that the scope of the embodiments is not limited in this respect. The OFDM signals may include a plurality of orthogonal subcarriers.

In some embodiments, a downlink resource grid can be used for downlink transmissions from any one of the RAN nodes 1111 and 1112 to the UEs 1101 and 1102, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid correspond to one OFDM symbol and one OFDM subcarrier, respectively. The duration of the resource grid in the time domain corresponds to one slot in a radio frame. The smallest time-frequency unit in a resource grid is denoted as a resource element. Each resource grid includes a number of resource blocks, which describe the mapping of certain physical channels to resource elements. Each resource block includes a collection of resource elements; in the frequency domain, this may represent the smallest quantity of resources that can currently be allocated. There are several different physical downlink channels that are conveyed using such resource blocks.

The PDSCH may carry user data and higher-layer signaling to the UEs 1101 and 1102. The PDCCH may carry information about the transport format and resource allocations related to the PDSCH, among other things. The PDCCH may also inform the UEs 1101 and 1102 about the transport format, resource allocation, and H-ARQ (Hybrid Automatic Repeat Request) information related to the uplink shared channel. Typically, downlink scheduling (assigning control and shared channel resource blocks to a UE within a cell) may be performed at any of the RAN nodes 1111 and 1112 based on channel quality information fed back from any one of the UEs 1101 and 1102. The downlink resource assignment information may be sent on the PDCCH used for (e.g., assigned to) each of the UEs 1101 and 1102.

The PDCCH may use control channel elements (CCEs) to convey the control information. Before being mapped to resource elements, PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG. The PDCCH can be transmitted using one or more CCEs, depending on the size of the downlink control information (DCI) and the channel condition. There can be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an enhanced physical downlink control channel (EPDCCH) that uses PDSCH resources for control information transmission. The EPDCCH may be transmitted using one or more enhanced control channel elements (ECCEs). Similar to above, each ECCE may correspond to nine sets of four physical resource elements known as enhanced resource element groups (EREGs). One of the ECCEs may have other numbers of EREGs in some situations.

The RAN 1110 is shown to be communicatively coupled to the core network (CN) 1120 via an S1 interface 1113. In some embodiments, the CN 1120 may be an evolved packet core (EPC) network, a NextGen Packet Core (NPC) network, or some other type of CN. In this embodiment, the S1 interface 1113 is split into two parts, including an S1-U interface 1114 and an S1-mobility management entity (MME) interface 1115. The S1-U interface 1114 carries traffic data between the RAN nodes 1111 and 1112 and a serving gateway (S-GW) 1122. The S1-MME interface 1115 is a signaling interface between the RAN nodes 1111 and 1112 and MMEs 1121.

In this embodiment, the CN 1120 includes the MMEs 1121, the S-GW 1122, a Packet Data Network (PDN) Gateway (P-GW) 1123, and a home subscriber server (HSS) 1124. The MMEs 1121 may be similar in function to the control plane of legacy Serving GPRS (General Packet Radio Service) Support Nodes (SGSNs). The MMEs 1121 may manage mobility aspects in access such as gateway selection and tracking area list management. The HSS 1124 may include a database for network users, including subscription-related information to support the network entities' handling of communication sessions. The CN 1120 may include one or several HSSs 1124, depending on the number of mobile subscribers, on the capacity of the equipment, on the organization of the network, etc. For example, the HSS 1124 can provide support for routing/roaming, authentication, authorization, naming/addressing resolution, location dependencies, etc.

The S-GW 1122 terminates the S1 interface 1113 towards the RAN 1110, and routes data packets between the RAN 1110 and the CN 1120. In addition, the S-GW 1122 may be a local mobility anchor point for inter-RAN node handovers, and also may provide an anchor for inter-3GPP mobility. Other responsibilities of the S-GW 1122 may include lawful intercept, charging, and some policy enforcement.

The P-GW 1123 terminates an SGi interface toward a PDN. The P-GW 1123 routes data packets between the CN 1120 (e.g., the EPC network) and external networks such as a network including an application server 1130 (alternatively referred to as application function (AF)) via an Internet Protocol (IP) interface 1125. Generally, the application server 1130 may be an element offering applications that use IP bearer resources with the core network 1120 (e.g., UMTS Packet Services (PS) domain, LTE PS data services, etc.). In this embodiment, the P-GW 1123 is shown to be communicatively coupled to the application server 1130 via the IP interface 1125. The application server 1130 can also be configured to support one or more communication services (e.g., Voice-over-Internet Protocol (VoIP) sessions, PTT sessions, group communication sessions, social networking services, etc.) for the UEs 1101 and 1102 via the CN 1120.

In some embodiments, the P-GW 1123 may further be a node for policy enforcement and charging data collection. The CN 1120 may further include a policy and charging control element (e.g., Policy and Charging Enforcement Function (PCRF) 1126). In a non-roaming scenario, there may be a single PCRF in the Home Public Land Mobile Network (HPLMN) associated with a UE's Internet Protocol Connectivity Access Network (IP-CAN) session. In a roaming scenario with local breakout of traffic, there may be two PCRFs associated with a UE's IP-CAN session: a Home PCRF (H-PCRF) within a HPLMN and a Visited PCRF (V-PCRF) within a Visited Public Land Mobile Network (VPLMN). The PCRF 1126 may be communicatively coupled to the application server 1130 via the P-GW 1123. The application server 1130 may signal the PCRF 1126 to indicate a new service flow and select appropriate Quality of Service (QoS) and charging parameters. The PCRF 1126 may provision this rule into a Policy and Charging Enforcement Function (PCEF) (not shown) with appropriate traffic flow template (TFT) and QoS class of identifier (QCI), which commences the QoS and charging as specified by the application server 1130.

Figure 12:
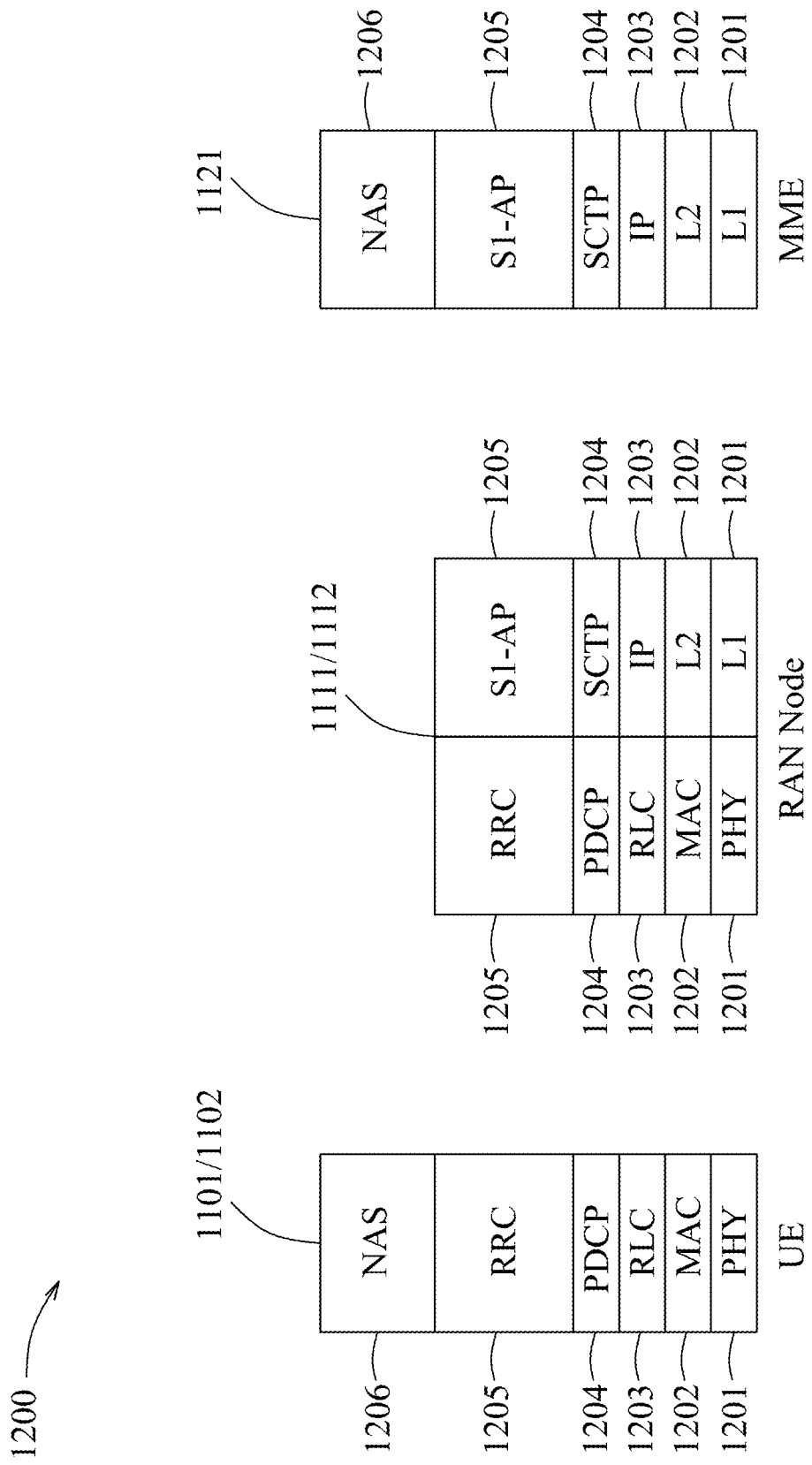
FIG. 12 illustrates an example of a control plane protocol stack according to some embodiments of this disclosure.

FIG. 12 illustrates an example of a control plane protocol stack according to some embodiments of this disclosure. In the example of FIG. 12, a control plane 1200 is shown as a communications protocol stack between the UE 1101 (or alternatively, the UE 1102), the RAN node 1111 (or alternatively, the RAN node 1112), and the MME 1121.

The PHY layer 1201 may transmit or receive information used by the MAC layer 1202 over one or more air interfaces. The PHY layer 1201 may further perform link adaptation or adaptive modulation and coding (AMC), power control, cell search (e.g., for initial synchronization and handover purposes), and other measurements used by higher layers, such as the RRC layer 1205. The PHY layer 1201 may still further perform error detection on the transport channels, forward error correction (FEC) coding/decoding of the transport channels, modulation/demodulation of physical channels, interleaving, rate matching, mapping onto physical channels, and Multiple Input Multiple Output (MIMO) antenna processing.

The MAC layer 1202 may perform mapping between logical channels and transport channels, multiplexing of MAC service data units (SDUs) from one or more logical channels onto transport blocks (TB) to be delivered to the PHY layer 1201 via transport channels, de-multiplexing MAC SDUs to one or more logical channels from transport blocks (TB) delivered from the PHY layer 1201 via transport channels, multiplexing MAC SDUs onto TBs, scheduling information reporting, error correction through hybrid automatic repeat request (HARQ), and logical channel prioritization.

The RLC layer 1203 may operate in a plurality of modes of operation, including Transparent Mode (TM), Unacknowledged Mode (UM) and Acknowledged Mode (AM). The RLC layer 1203 may execute transfer of upper layer protocol data units (PDUs), error correction through automatic repeat request (ARQ) for AM data transfers, and concatenation, segmentation and reassembly of RLC SDUs for UM and AM data transfers. The RLC layer 1203 may also execute re-segmentation of RLC data PDUs for AM data transfers, reorder RLC data PDUs for UM and AM data transfers, detect duplicate data for UM and AM data transfers, discard RLC SDUs for UM and AM data transfers, detect protocol errors for AM data transfers, and perform RLC re-establishment.

The PDCP layer 1204 may execute header compression and decompression of IP data, maintain PDCP Sequence Numbers (SNs), perform in-sequence delivery of upper layer PDUs at re-establishment of lower layers, eliminate duplicates of lower layer SDUs at re-establishment of lower layers for radio bearers mapped on RLC AM, cipher and decipher control plane data, perform integrity protection and integrity verification of control plane data, control timer-based discard of data, and perform security operations (e.g., ciphering, deciphering, integrity protection, integrity verification, etc.).

The main services and functions of the RRC layer 1205 may include broadcast of system information (e.g., included in Master Information Blocks (MIBs) or System Information Blocks (SIBs) related to the non-access stratum (NAS)), broadcast of system information related to the access stratum (AS), paging, establishment, maintenance and release of an RRC connection between the UE 1101 or 1102 and the E-UTRAN (e.g., RRC connection paging, RRC connection establishment, RRC connection modification, and RRC connection release), establishment, configuration, maintenance and release of point-to-point radio bearers, security functions including key management, inter radio access technology (RAT) mobility, and measurement configuration for UE measurement reporting. Said MIBs and SIBs may include one or more information elements (IEs), which may each comprise individual data fields or data structures.

The UE 1101 and the RAN node 1111 of FIG. 11 may utilize a Uu interface (e.g., an LTE-Uu interface) to exchange control plane data via a protocol stack including the PHY layer 1201, the MAC layer 1202, the RLC layer 1203, the PDCP layer 1204 and the RRC layer 1205.

The non-access stratum (NAS) protocols 1206 form the highest stratum of the control plane between the UE 1101 or 1102 and the MME 1121. The NAS protocols 1206 support the mobility of the UE 1101 or 1102 and the session management procedures to establish and maintain IP connectivity between the UE 1101 or 1102 and the P-GW 1123 (see FIG. 11).

The S1 Application Protocol (S1-AP) layer 1215 may support the functions of the S1 interface, and include Elementary Procedures (EPs). An EP is a unit of interaction between the RAN node 1111 or 1112 and the CN 1120 (see FIG. 11). The S1-AP layer 1215 provides services that may include two groups, i.e., UE-associated services and non UE-associated services. These services perform functions including, but not limited to, E-UTRAN Radio Access Bearer (E-RAB) management, UE capability indication, mobility, NAS signaling transport, RAN Information Management (RIM), and configuration transfer.

A Stream Control Transmission Protocol (SCTP) layer 1214 may ensure reliable delivery of signaling messages between the RAN node 1111 or 1112 and the MME 1121 based, in part, on the IP protocol supported by the IP layer 1213. An L2 layer 1212 and an L1 layer 1211 may refer to communication links (e.g., wired or wireless) used by the RAN node 1111 or 1112 and the MME 1121 to exchange information.

The RAN node 1111 and the MME 1121 may utilize an S1-MME interface to exchange control plane data via a protocol stack including the L1 layer 1211, the L2 layer 1212, the IP layer 1213, the SCTP layer 1214, and the S1-AP layer 1215.

Figure 13:
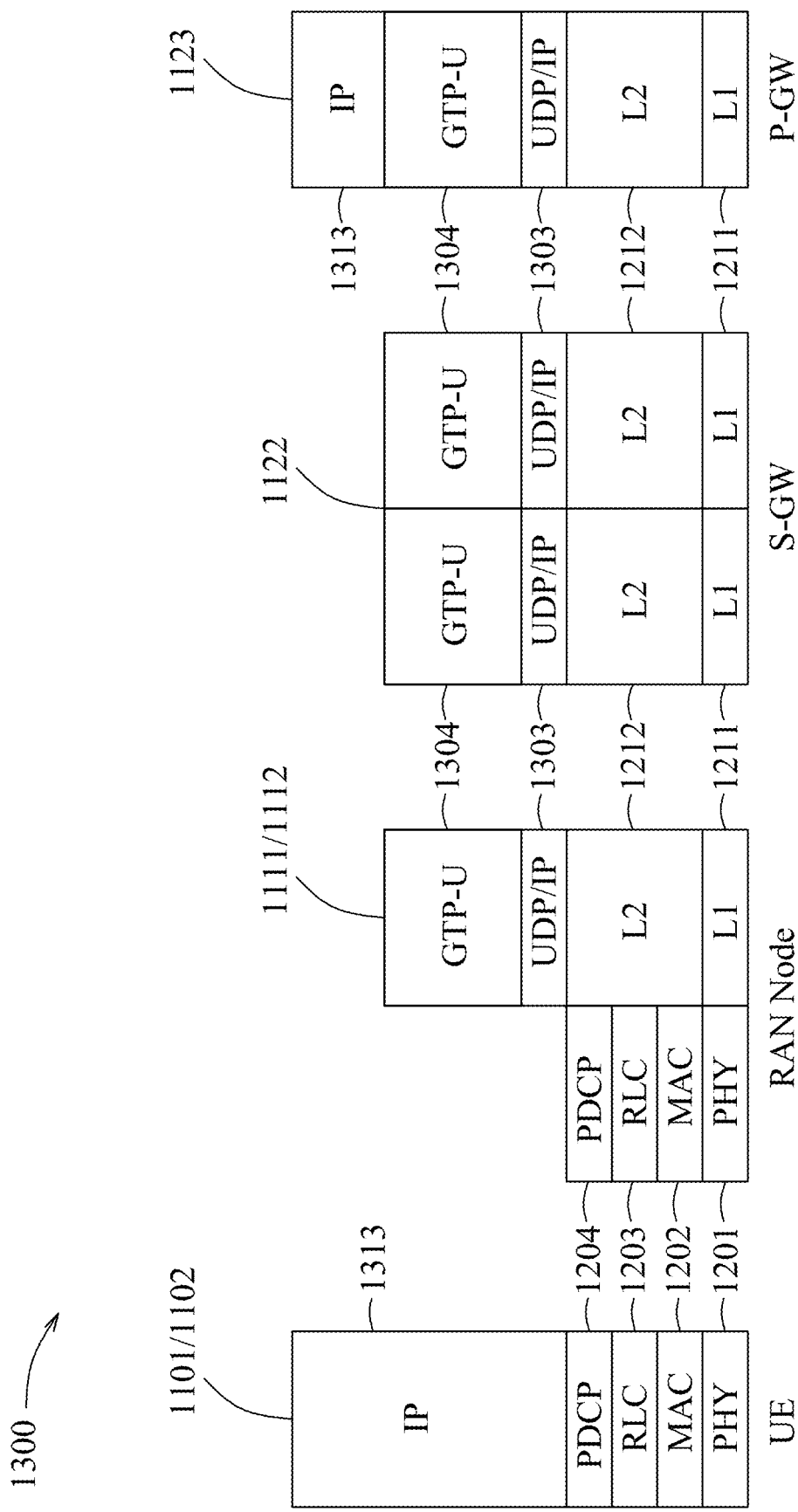
FIG. 13 illustrates an example of a user plane protocol stack according to some embodiments of this disclosure.

FIG. 13 illustrates an example of a user plane protocol stack according to some embodiments of this disclosure. In this example, a user plane 1300 is shown as a communications protocol stack between the UE 1101 (or alternatively, the UE 1102), the RAN node 1111 (or alternatively, the RAN node 1112), the S-GW 1122, and the P-GW 1123. The user plane 1300 may utilize at least some of the same protocol layers as the control plane 1200 of FIG. 12. For example, the UE 1101 or 1102 and the RAN node 1111 or 1112 may utilize a Uu interface (e.g., an LTE-Uu interface) to exchange user plane data via a protocol stack also including a PHY layer 1201, a MAC layer 1202, an RLC layer 1203 and a PDCP layer 1204 (see FIG. 12).

A General Packet Radio Service (GPRS) Tunneling Protocol for the user plane (GTP-U) layer 1304 may be used for carrying user data within the GPRS core network and between the radio access network and the core network. The user data transported can be packets in any of IPv4, IPv6, or PPP formats. A UDP and IP security (UDP/IP) layer 1303 may provide checksums for data integrity, port numbers for addressing different functions at the source and destination, and encryption and authentication on the selected data flows. The RAN node 1111 or 1112 and the S-GW 1122 may utilize an S1-U interface to exchange user plane data via a protocol stack including the L1 layer 1211, the L2 layer 1212, the UDP/IP layer 1303, and the GTP-U layer 1304. The S-GW 1122 and the P-GW 1123 may utilize an S5/S8a interface to exchange user plane data via a protocol stack including the L1 layer 1211, the L2 layer 1212, the UDP/IP layer 1303, and the GTP-U layer 1304. The protocol stack for the P-GW 1123 may further include the IP layer 1313. As discussed above with respect to FIG. 12, NAS protocols support the mobility of the UE 1101 or 1102 and the session management procedures to establish and maintain IP connectivity between the UE 1101 or 1102 and the P-GW 1123.

Figure 14:
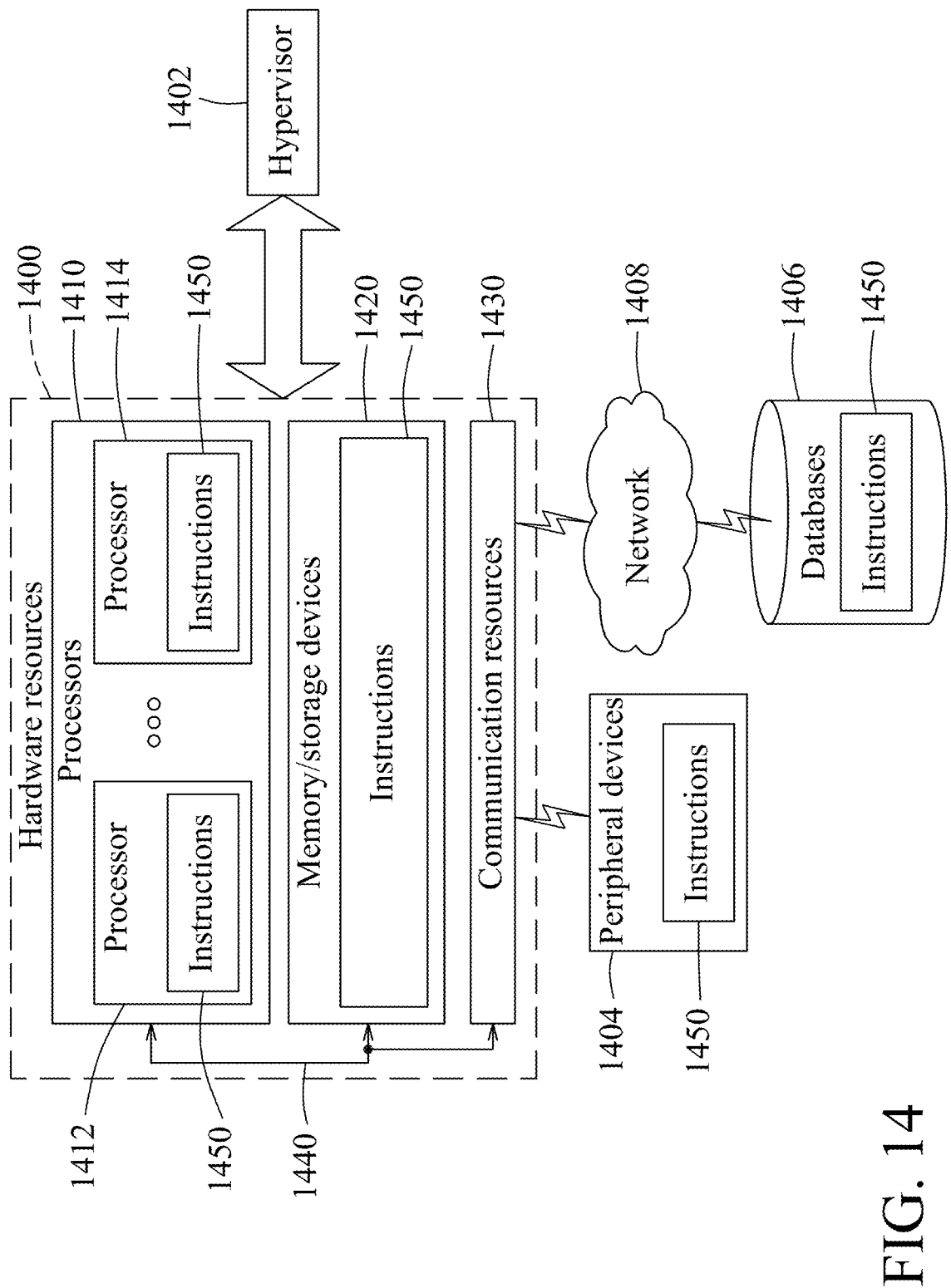
FIG. 14 is a block diagram illustrating components, according to some example embodiments, able to read instructions from a machine-readable or computer-readable medium and perform any one or more of the methodologies discussed herein.

FIG. 14 is a block diagram illustrating components, according to some example embodiments, able to read instructions from a machine-readable or computer-readable medium (e.g., a non-transitory machine-readable storage medium) and perform any one or more of the methodologies discussed herein. Specifically, FIG. 14 shows a diagrammatic representation of hardware resources 1400 including one or more processors (or processor cores) 1410, one or more memory/storage devices 1420, and one or more communication resources 1430, each of which may be communicatively coupled via a bus 1440. For embodiments where node virtualization (e.g., NFV) is utilized, a hypervisor 1402 may be executed to provide an execution environment for one or more network slices/sub-slices to utilize the hardware resources 1400.

The processors 1410 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 1412 and a processor 1414.

The memory/storage devices 1420 may include main memory, disk storage, or any suitable combination thereof. The memory/storage devices 1420 may include, but are not limited to any type of volatile or non-volatile memory such as dynamic random access memory (DRAM), static random-access memory (SRAM), erasable programmable read-only memory (EPROM), electrically erasable programmable read-only memory (EEPROM), Flash memory, solid-state storage, etc.

The communication resources 1430 may include interconnection or network interface components or other suitable devices to communicate with one or more peripheral devices 1404 or one or more databases 1406 via a network 1408. For example, the communication resources 1430 may include wired communication components (e.g., for coupling via a Universal Serial Bus (USB)), cellular communication components, NFC components, Bluetooth® components (e.g., Bluetooth® Low Energy), Wi-Fi® components, and other communication components.

Instructions 1450 may comprise software, a program, an application, an applet, an app, or other executable code for causing at least any of the processors 1410 to perform any one or more of the methodologies discussed herein. The instructions 1450 may reside, completely or partially, within at least one of the processors 1410 (e.g., within the processor's cache memory), the memory/storage devices 1420, or any suitable combination thereof. Furthermore, any portion of the instructions 1450 may be transferred to the hardware resources 1400 from any combination of the peripheral devices 1404 or the databases 1406. Accordingly, the memory of processors 1410, the memory/storage devices 1420, the peripheral devices 1404, and the databases 1406 are examples of computer-readable and machine-readable media.

EXAMPLES

The following examples pertain to specific technology embodiments and point out specific features, elements, or actions that can be used or otherwise combined in achieving such embodiments.

Example 1 is an apparatus of a radio access network (RAN). The apparatus comprises baseband circuitry that includes one or more processors and a radio frequency (RF) interface. The one or more processors are to generate, for user equipment (UE) operating on a licensed assisted access (LAA) secondary cell (SCell), a data sequence associated with a synchronization signal (SS) block. The SS block includes a primary synchronization signal (PSS) and a secondary synchronization signal (SSS), but does not include a physical broadcast channel (PBCH). The RF interface is to receive the data sequence from the one or more processors.

In Example 2, the subject matter of Example 1 or any of the Examples described herein may further include that the one or more processors of the baseband circuitry are further to generate one of physical downlink control channel (PDCCH) content and physical downlink shared channel (PDSCH) content to be provided to the UE over a transmission resource originally allocated for PBCH.

In Example 3, the subject matter of Example 2 or any of the Examples described herein may further include that the one or more processors of the baseband circuitry are further to generate one of radio resource control (RRC) data and downlink control information (DCI) data for configuration of the UE in terms of receiving said one of the PDCCH content and the PDSCH content.

In Example 4, the subject matter of Example 1 or any of the Examples described herein may further include that the one or more processors of the baseband circuitry are to generate the data sequence associated with the SS block which includes the PSS to be included in a last OFDM symbol originally allocated for PBCH in the SS Block.

In Example 5, the subject matter of Example 4 or any of the Examples described herein may further include that a center frequency of the PSS is identical to a center frequency of the SSS in the SS block. The SSS is to be included in a second last OFDM symbol of the SS block.

In Example 6, the subject matter of Example 4 or any of the Examples described herein may further include that the one or more processors of the baseband circuitry are to generate the data sequence associated with the SS block which includes the PSS repeated in frequency domain over the last OFDM symbol originally allocated for PBCH in the SS block.

In Example 7, the subject matter of Example 6 or any of the Examples described herein may further include that a first instance of the PSS is located in first twelve physical resource blocks (PRBs) of the last OFDM symbol originally allocated for PBCH in the SS block, a second instance of the PSS is located in another twelve PRBs of the last OFDM symbol originally allocated for PBCH in the SS block immediately following the first twelve PRBs, and an orthogonal cover code (OCC) is applied to the first and second instances of the PSS in frequency domain.

In Example 8, the subject matter of Example 4 or any of the Examples described herein may further include that a sequence of the PSS is one of a binary phase-shift keying (BPSK) modulated maximum length sequence (MLS), a Zadoff-Chu (ZC) sequence, and a pseudo-random or computer-generated sequence.

In Example 9, the subject matter of Example 1 or any of the Examples described herein may further include that the one or more processors of the baseband circuitry are to generate the data sequence associated with the SS block which includes a repetition of the PSS and a repetition of the SSS to be included in OFDM symbols originally allocated for PBCH in the SS block.

In Example 10, the subject matter of Example 9 or any of the Examples described herein may further include that the one or more processors of the baseband circuitry are to generate the data sequence associated with the SS block which includes the repetition of the PSS to be included in a first OFDM symbol originally allocated for PBCH in the SS block, and the repetition of the SSS to be included in a second OFDM symbol originally allocated for PBCH in the SS block.

In Example 11, the subject matter of Example 9 or any of the Examples described herein may further include that the one or more processors of the baseband circuitry are to generate the data sequence associated with the SS block which includes the repetition of the PSS and the repetition of the SSS, one of which is duplicated in frequency domain over one of the OFDM symbols originally allocated for PBCH in the SS block.

In Example 12, the subject matter of Example 9 or any of the Examples described herein may further include that the one or more processors of the baseband circuitry are to generate the data sequence associated with the SS block which includes the repetition of the PSS and the repetition of the SSS, one of which is designed to cover a larger frequency span and to be included in the full bandwidth available on one of the OFDM symbols originally allocated for PBCH in the SS block.

In Example 13, the subject matter of Example 1 or any of the Examples described herein may further include that the one or more processors of the baseband circuitry are to generate another data sequence associated with one of a PSS and an SSS to be included in an OFDM symbol which is originally not used to carry an SS block.

In Example 14, the subject matter of Example 13 or any of the Examples described herein may further include that the one or more processors of the baseband circuitry are to generate the another data sequence associated with one of the PSS and the SSS to be included in the OFDM symbol of a specific slot. The OFDM symbol does not belong to first X OFDM symbols or last X OFDM symbols of the specific slot, where X is an integer decided according subcarrier spacing.

In Example 15, the subject matter of Example 13 or any of the Examples described herein may further include that the one or more processors of the baseband circuitry are to generate the another data sequence associated with one of the PSS and the SSS to be included in the OFDM symbol of a specific slot. The OFDM symbol belongs to last X OFDM symbols of the specific slot or OFDM symbols originally not used for transmission of PDCCH and PUCCH, where X is an integer decided according to subcarrier spacing.

Example 16 is an apparatus of a radio access network (RAN). The apparatus comprises baseband circuitry that includes one or more processors, and a radio frequency (RF) interface. The one or more processors are to generate, for initial access in an unlicensed carrier, data containing information regarding listen before talk (LBT). The LBT is to be performed to acquire a channel for transmission of a synchronization signal (SS) block. The RF interface to receive the data from the one or more processors.

In Example 17, the subject matter of Example 16 or any of the Examples described herein may further include that the LBT is to be applied before the transmission of each SS burst, the SS burst includes a plurality of SS blocks, and a channel occupancy time related to success of the LBT is not smaller than duration of the SS burst.

In Example 18, the subject matter of Example 17 or any of the Examples described herein may further include that when it is determined by the one or more processors of the baseband circuitry that the LBT did not succeed before a time point the SS burst is expected to start being transmitted, the LBT is performed repeatedly until success of the LBT is obtained, a portion of the SS blocks of the SS burst expected to be transmitted from the time point up to a moment of the success of the LBT is skipped from being transmitted, and a remaining portion of the SS blocks of the SS burst is transmitted.

In Example 19, the subject matter of Example 17 or any of the Examples described herein may further include that when it is determined by the one or more processors of the baseband circuitry that the LBT did not succeed before the SS burst is expected to start being transmitted, all of the SS blocks of the SS burst are skipped from being transmitted.

In Example 20, the subject matter of Example 17 or any of the Examples described herein may further include that when it is determined by the one or more processors of the baseband circuitry that the LBT did not succeed before a time point the SS burst is expected to start being transmitted, the LBT is performed repeatedly until success of the LBT is obtained, and start of transmission of the SS burst is deferred to a moment the success of the LBT is obtained.

In Example 21, the subject matter of Example 20 or any of the Examples described herein may further include that after the deferment, only a portion of the SS blocks of the SS burst up to a boundary between a first half frame of a radio frame and a second half frame of the radio frame is transmitted, and a remaining portion of the SS blocks of the SS burst is skipped from being transmitted.

In Example 22, the subject matter of Example 20 or any of the Examples described herein may further include that the one or more processors of the baseband circuitry are to configure the data containing information regarding LBT to enable the LBT to be initiated in a first half frame of a radio frame, and the start of the transmission of the SS burst is deferred in such a manner that none of the SS blocks of the SS burst is to be transmitted within a second half frame of the radio frame.

In Example 23, the subject matter of Example 20 or any of the Examples described herein may further include that the one or more processors of the baseband circuitry are to configure the data containing information regarding LBT to enable the LBT to be initiated in a first half frame of a radio frame, and when it is determined that not all of the SS blocks of the SS burst can be transmitted in the first half frame, the LBT is performed once again in a second half frame of the radio frame in order to perform the transmission of a portion of the SS blocks of the SS burst not completed in the first radio frame.

In Example 24, the subject matter of Example 17 or any of the Examples described herein may further include that the LBT is performed at the beginning of each of a first half frame and a second half frame of a radio frame, and the transmission of the SS burst is performed in one of the first half frame and the second half frame.

In Example 25, the subject matter of Example 16 or any of the Examples described herein may further include that the one or more processors of the baseband circuitry are to determine a category of the LBT based on subcarrier spacing, and the LBT is to be performed before the transmission of each SS block.

In Example 26, the subject matter of Example 16 or any of the Examples described herein may further include that the one or more processors of the baseband circuitry are to determine a category of the LBT based on subcarrier spacing, and the LBT is to be performed before each slot where two or more SS blocks are to be transmitted.

In Example 27, the subject matter of Example 16 or any of the Examples described herein may further include that the LBT is to be performed for each group of consecutive SS blocks, and a priority class of the LBT is decided according to a length of the consecutive SS blocks in the group.

In the foregoing specification, a detailed description has been given with reference to specific embodiments. It can, however, be evident that various modifications and changes may be made thereto without departing from the broader spirit and scope of the present techniques as set forth in the appended claims. The specification and drawings are, accordingly, to be regarded in an illustrative sense rather than a restrictive sense. Furthermore, the foregoing use of the term "embodiment" and other language does not necessarily refer to the same embodiment or the same example, but may refer to different and distinct embodiments, as well as potentially the same embodiment.

What is claimed is:

1. An apparatus of a radio access network (RAN) comprising baseband circuitry that includes:
one or more processors configured to generate, for initial access in an unlicensed carrier, data containing information regarding listen before talk (LBT), the LBT to be performed to acquire a channel for transmission of a synchronization signal (SS) block, wherein the LBT is to be applied before a first transmission of an SS burst, wherein the SS burst includes one or more SS blocks, wherein, when it is determined by the one or more processors of the baseband circuitry that start of transmission of the SS burst is deferred, a respective timing index in a respective SS block of the SS burst is set according to the deferment, and wherein after the deferment, only a portion of the SS blocks of the SS burst up to a boundary between a first half frame of a radio frame and a second half frame of the radio frame is transmitted, and a remaining portion of the SS blocks of the SS burst is skipped from being transmitted; and
a radio frequency (RF) interface configured to receive the data from the one or more processors.

2. The apparatus as claimed in claim 1, wherein a channel occupancy time related to success of the LBT is not smaller than duration of the SS burst.

3. The apparatus as claimed in claim 2, wherein, when it is determined by the one or more processors of the baseband circuitry that the LBT did not succeed before a time point the SS burst is expected to start being transmitted, the LBT is performed repeatedly until success of the LBT is obtained, a portion of the SS blocks of the SS burst expected to be transmitted from the time point up to a moment of the success of the LBT is skipped from being transmitted, and a remaining portion of the SS blocks of the SS burst is transmitted.

4. The apparatus as claimed in claim 1, wherein when it is determined by the one or more processors of the baseband circuitry that the LBT did not succeed before a time point the SS burst is expected to start being transmitted, the LBT is performed repeatedly until success of the LBT is obtained, and start of transmission of the SS burst is deferred until the success of the LBT is obtained.

5. The apparatus as claimed in claim 1, wherein the one or more processors of the baseband circuitry are to configure the data containing information regarding LBT to enable the LBT to be initiated in a first half frame of a radio frame, and the start of the transmission of the SS burst is deferred in such a manner that none of the SS blocks of the SS burst is to be transmitted within a second half frame of the radio frame.

6. The apparatus as claimed in claim 1, wherein the one or more processors of the baseband circuitry are to configure the data containing information regarding LBT to enable the LBT to be initiated in a first half frame of a first radio frame, and when it is determined that not all of the SS blocks of the SS burst can be transmitted in the first half frame, the LBT is performed once again in a second half frame of the first radio frame in order to perform the transmission of a portion of the SS blocks of the SS burst not completed in the first radio frame.

7. The apparatus as claimed in claim 1, wherein the LBT is performed at a beginning of each of a first half frame and a second half frame of a radio frame, and the transmission of the SS burst is performed in one of the first half frame and the second half frame.

8. The apparatus as claimed in claim 1, wherein the one or more processors of the baseband circuitry are to determine a category of the LBT based on subcarrier spacing, and the LBT is to be performed before transmission of each SS block.

9. The apparatus as claimed in claim 1, wherein the one or more processors of the baseband circuitry are to determine a category of the LBT based on subcarrier spacing, and the LBT is to be performed before each slot where two or more SS blocks are to be transmitted.

10. The apparatus as claimed in claim 1, wherein the LBT is to be performed for each group of consecutive SS blocks, and a priority class of the LBT is decided according to a length of the consecutive SS blocks in the group.

11. A non-transitory computer readable memory medium storing program instructions executable by one or more processors of a radio access network (RAN) node to:

generate, for initial access in an unlicensed carrier, data containing information regarding listen before talk (LBT), the LBT to be performed to acquire a channel for transmission of a synchronization signal (SS) block, wherein the LBT is to be applied before a first transmission of an SS burst, wherein the SS burst includes one or more SS blocks, wherein, when it is determined that start of transmission of the SS burst is deferred, a respective timing index in a respective SS block of the SS burst is set according to the deferment, and wherein after the deferment, only a portion of the SS blocks of the SS burst up to a boundary between a first half frame of a radio frame and a second half frame of the radio frame is transmitted, and a remaining portion of the SS blocks of the SS burst is skipped from being transmitted; and send the data to a radio frequency (RF) interface of the RAN node.

12. The non-transitory computer readable memory medium as claimed in claim 11,
wherein a channel occupancy time related to success of the LBT is not smaller than duration of the SS burst.

13. The non-transitory computer readable memory medium as claimed in claim 12,
wherein, when it is determined that the LBT did not succeed before a time point the SS burst is expected to start being transmitted, the LBT is performed repeatedly until success of the LBT is obtained, a portion of the SS blocks of the SS burst expected to be transmitted from the time point up to a moment of the success of the LBT is skipped from being transmitted, and a remaining portion of the SS blocks of the SS burst is transmitted.

14. The non-transitory computer readable memory medium as claimed in claim 11,
wherein when it is determined the LBT did not succeed before a time point the SS burst is expected to start being transmitted, the LBT is performed repeatedly until success of the LBT is obtained, and start of transmission of the SS burst is deferred until the success of the LBT is obtained.

15. The non-transitory computer readable memory medium as claimed in claim 11,
wherein the program instructions are further executable by the one or more processors of the RAN node to configure the data containing information regarding LBT to enable the LBT to be initiated in a first half frame of a radio frame, and the start of the transmission of the SS burst is deferred in such a manner that none of the SS blocks of the SS burst is to be transmitted within a second half frame of the radio frame.

16. The non-transitory computer readable memory medium as claimed in claim 11,
wherein the program instructions are further executable by the one or more processors of the RAN node to configure the data containing information regarding LBT to enable the LBT to be initiated in a first half frame of a first radio frame, and when it is determined that not all of the SS blocks of the SS burst can be transmitted in the first half frame, the LBT is performed once again in a second half frame of the first radio frame in order to perform the transmission of a portion of the SS blocks of the SS burst not completed in the first radio frame.

17. The non-transitory computer readable memory medium as claimed in claim 11,
wherein the LBT is performed at a beginning of each of a first half frame and a second half frame of a radio frame, and the transmission of the SS burst is performed in one of the first half frame and the second half frame.

18. A method for a Listen Before Talk (LBT) for initial access in an unlicensed carrier, comprising:
generating, for initial access in the unlicensed carrier, data containing information regarding LBT, the LBT to be performed to acquire a channel for transmission of a synchronization signal (SS) block, wherein the LBT is to be applied before a first transmission of an SS burst, wherein the SS burst includes one or more SS blocks, wherein, when it is determined that start of transmission of the SS burst is deferred, a respective timing index in a respective SS block of the SS burst is set according to the deferment, and wherein, after the deferment, only a portion of the SS blocks of the SS burst up to a boundary between a first half frame of a radio frame and a second half frame of the radio frame is transmitted and a remaining portion of the SS blocks of the SS burst is skipped from being transmitted; and
sending the data to a radio frequency (RF) interface of a radio access network (RAN) node.

19. The method as claimed in claim 18,
wherein a channel occupancy time related to success of the LBT is not smaller than duration of the SS burst.

20. The method as claimed in claim 19,
wherein, when it is determined that the LBT did not succeed before a time point the SS burst is expected to start being transmitted, the LBT is performed repeatedly until success of the LBT is obtained, a portion of the SS blocks of the SS burst expected to be transmitted from the time point up to a moment of the success of the LBT is skipped from being transmitted, and a remaining portion of the SS blocks of the SS burst is transmitted.

21. The method as claimed in claim 16,
wherein when it is determined the LBT did not succeed before a time point the SS burst is expected to start being transmitted, the LBT is performed repeatedly until success of the LBT is obtained, and start of transmission of the SS burst is deferred until the success of the LBT is obtained.

22. The method as claimed in claim 18, further comprising:
configuring the data containing information regarding LBT to enable the LBT to be initiated in a first half frame of a radio frame, and the start of the transmission of the SS burst is deferred in such a manner that none of the SS blocks of the SS burst is to be transmitted within a second half frame of the radio frame.

23. The method as claimed in claim 18, further comprising:
configuring the data containing information regarding LBT to enable the LBT to be initiated in a first half frame of a first radio frame, and when it is determined that not all of the SS blocks of the SS burst can be transmitted in the first half frame, the LBT is performed once again in a second half frame of the first radio frame in order to perform the transmission of a portion of the SS blocks of the SS burst not completed in the first radio frame.

24. The method as claimed in claim 18,
wherein the LBT is performed at a beginning of each of a first half frame and a second half frame of a radio frame, and the transmission of the SS burst is performed in one of the first half frame and the second half frame.

25. The method as claimed in claim 18, further comprising:
   determining a category of the LBT based on subcarrier spacing, and the LBT is to be performed before transmission of each SS block.

26. The method as claimed in claim 18, further comprising:
   determining a category of the LBT based on subcarrier spacing, and the LBT is to be performed before each slot where two or more SS blocks are to be transmitted.

27. The method as claimed in claim 18,
   wherein the LBT is to be performed for each group of consecutive SS blocks, and a priority class of the LBT is decided according to a length of the consecutive SS blocks in the group.

* * * * *